(12) United States Patent
Yoshioka et al.

(10) Patent No.: US 12,457,584 B2
(45) Date of Patent: Oct. 28, 2025

(54) TERMINAL AND COMMUNICATION METHOD

(71) Applicant: NTT DOCOMO, INC., Tokyo (JP)

(72) Inventors: Shohei Yoshioka, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 471 days.

(21) Appl. No.: 17/757,271

(22) PCT Filed: Dec. 17, 2019

(86) PCT No.: PCT/JP2019/049474
§ 371 (c)(1),
(2) Date: Jun. 13, 2022

(87) PCT Pub. No.: WO2021/124462
PCT Pub. Date: Jun. 24, 2021

(65) Prior Publication Data
US 2023/0007628 A1    Jan. 5, 2023

(51) Int. Cl.
*H04W 72/02* (2009.01)
*H04L 1/08* (2006.01)
*H04W 72/0446* (2023.01)
*H04W 72/0453* (2023.01)

(52) U.S. Cl.
CPC ............ *H04W 72/02* (2013.01); *H04L 1/08* (2013.01); *H04W 72/0446* (2013.01); *H04W 72/0453* (2013.01)

(58) Field of Classification Search
CPC ............ H04W 72/02; H04W 72/0446; H04W 72/0453; H04L 1/08
See application file for complete search history.

(56) References Cited

U.S. PATENT DOCUMENTS

| | | | |
|---|---|---|---|
| 11,082,954 B2* | 8/2021 | Huang | H04W 72/02 |
| 11,109,363 B2* | 8/2021 | Huang | H04L 1/1812 |
| 11,695,516 B2* | 7/2023 | Huang | H04L 1/1864 |
| | | | 370/312 |
| 2020/0267729 A1* | 8/2020 | Kim | H04W 72/20 |
| 2020/0351033 A1* | 11/2020 | Ryu | H04L 1/1861 |
| 2020/0366427 A1* | 11/2020 | Wang | H04L 1/1816 |
| 2021/0014831 A1* | 1/2021 | Ryu | H04W 72/02 |
| 2021/0028891 A1* | 1/2021 | Zhou | H04W 4/40 |
| 2021/0160917 A1* | 5/2021 | Goto | H04W 72/0446 |
| 2021/0378046 A1* | 12/2021 | Shimoda | H04W 72/27 |
| 2022/0224443 A1* | 7/2022 | Lee | H04W 72/23 |

(Continued)

OTHER PUBLICATIONS

3GPP TSG RAN WG1 #98; R1-1909305 "Discussion on sidelink structure in NR V2X" ASUSTek; Prague, CZ; Aug. 26-30, 2019 (6 pages).

(Continued)

*Primary Examiner* — Blake J Rubin
(74) *Attorney, Agent, or Firm* — Osha Bergman Watanabe & Burton LLP

(57) ABSTRACT

A terminal includes a controller configured to identify a resource that is included in a time domain in which a first channel used for transmitting a response related to retransmission control is allocated, and that is included in a frequency domain that is not used for transmitting the first channel; and a transmitter configured to transmit a second channel or a signal by using the resource.

3 Claims, 15 Drawing Sheets

(56) References Cited

U.S. PATENT DOCUMENTS

| | | | | |
|---|---|---|---|---|
| 2022/0225290 A1* | 7/2022 | Ganesan | ............... | H04W 72/02 |
| 2022/0394559 A1* | 12/2022 | Lee | ....................... | H04W 72/56 |
| 2022/0394744 A1* | 12/2022 | Lee | ....................... | H04L 1/1893 |
| 2023/0318789 A1* | 10/2023 | Mochizuki | ........ | H04W 72/0446 |
| | | | | 370/329 |

OTHER PUBLICATIONS

3GPP TSG RAN WG1 #98; R1-1908396 "Discussion on Sidelink physical layer structure" MediaTek Inc.; Prague, Czech; Aug. 26-30, 2019 (19 pages).

3GPP TSG RAN WG1 #98bis; R1-1910841 "Discussion on physical layer structure for sidelink in NR V2X" Panasonic; Chongqing, China; Oct. 14-20, 2019 (9 pages).

3GPP TSG-RAN WG1 #98bis; R1-1911106 "Sidelink Resource Allocation Mechanism for NR V2X" Qualcomm Incorporated; Chongqing, China; Oct. 14-20, 2019 (10 pages).

3GPP TS 36.211 V15.7.0 "3rd Generation Partnership Project; Technical Specification Group Radio Access Network; Evolved Universal Terrestrial Radio Access (E-UTRA); Physical channels and modulation (Release 15)" Sep. 2019 (240 pages).

3GPP TR 22.886 V15.1.0 "3rd Generation Partnership Project; Technical Specification Group Services and System Aspects; Study on enhancement of 3GPP Support for 5G V2X Services (Release 15)" Mar. 2017 (58 pages).

International Search Report issued in International Application No. PCT/JP2019/049474, mailed Mar. 24, 2020 (5 pages).

Written Opinion issued in International Application No. PCT/JP2019/049474; Dated Mar. 24, 2020 (3 pages).

Office Action issued in Chinese Application No. 201980102454.0, mailed Aug. 13, 2024 (14 pages).

* cited by examiner

TERMINAL AND COMMUNICATION METHOD

TECHNICAL FIELD

The present invention relates to a terminal and a communication method in a wireless communication system.

BACKGROUND ART

In the Long Term Evolution (LTE) and LTE successor systems (e.g., LTE Advanced (LTE-A), New Radio (NR, also called 5G)), a Device to Device (D2D) technology in which terminals communicate directly with each other without a base station is being discussed (e.g., Non-Patent Document 1).

D2D reduces traffics between terminals and base stations and enables communication between terminals even when a base station is unable to perform communication in time of a disaster, etc. Although 3rd Generation Partnership Project (3GPP) refers to D2D as a "sidelink", the more generic term D2D is used herein. However, in the description of the embodiment described below, sidelink is also used as needed.

D2D communication is broadly classified into: D2D discovery for discovering other terminals capable of communication; and D2D communication (D2D direct communication, D2D communication, direct communication between terminals, etc.) for performing direct communication between terminals. Hereinafter, when D2D communication, D2D discovery, etc. are not specifically distinguished, it is simply called D2D. A signal sent and received by D2D is called as a D2D signal. Various use cases of Vehicle to Everything (V2X) services in NR have been discussed (e.g., Non-Patent Document 2).

RELATED ART DOCUMENTS

Non-Patent Documents

Non-Patent Document 1: 3GPP TS 36.211 V15.7.0(2019-09)
Non-Patent Document 2: 3GPP TR 22.886 V15.1.0(2017-03)

SUMMARY OF INVENTION

Problem to be Solved by the Invention

For terminal-to-terminal direct communication in NR-V2X, the sidelink HARQ (Hybrid automatic repeat request) response is supported. The PSFCH (Physical Sidelink Feedback Channel) in which HARQ responses are sent and received, is located at a symbol different from PSCCH (Physical Sidelink Control Channel) or PSSCH (Physical Sidelink Shared Channel). Therefore, because PSFCH and PSCCH/PSSCH are not frequency multiplexed, resources that are located in a symbol in which PSFCH is located, and that are not used for HARQ response transmission and reception, remain unused, resulting in reduced resource utilization efficiency.

The present invention has been made in view of the above points and is intended to improve the efficiency of the utilization of resources related to the HARQ (Hybrid Automatic Repeat Request) response for direct communication between terminals.

Means for Solving Problems

According to the disclosed technology, there is provided a terminal including a controller configured to specify a resource in frequency domain that is included in a time domain range in which a first channel used for transmitting a response related to retransmission control is allocated and is not used for transmitting the first channel; and a transmitter configured to transmit a second channel or a signal by using the resource.

Effects of the Invention

The disclosed technology can improve the efficiency of the use of resources associated with a HARQ (Hybrid automatic repeat request) response.

MODE FOR CARRYING OUT THE INVENTION

Hereafter, exemplary embodiments of the present invention will be described with reference to the appended drawings. Embodiments to be described below are an example, and embodiments to which the present invention is applied are not limited to the following embodiments.

The existing technology is appropriately used for an operation of a wireless communication system of an embodiment of the present invention. Here, the existing technology is, for example, the existing LTE but is not limited to the existing LTE. The term "LTE" used in this specification has a broad meaning including LTE-Advanced and schemes after LTE-Advanced (for example, NR) or Wireless Local Area Network (LAN) unless otherwise specified.

Also, according to an embodiment of the present invention, a duplex scheme may be a Time Division Duplex (TDD) scheme, may be a Frequency Division Duplex (FDD) scheme, or may be other schemes (for example, Flexible Duplex or the like).

Further, according to an embodiment of the present invention, when a radio parameter or the like is "configured," it may mean that a predetermined value is pre-configured or may mean that a radio parameter indicated by a base station 10 or a terminal 20 may be configured.

Figure 1:
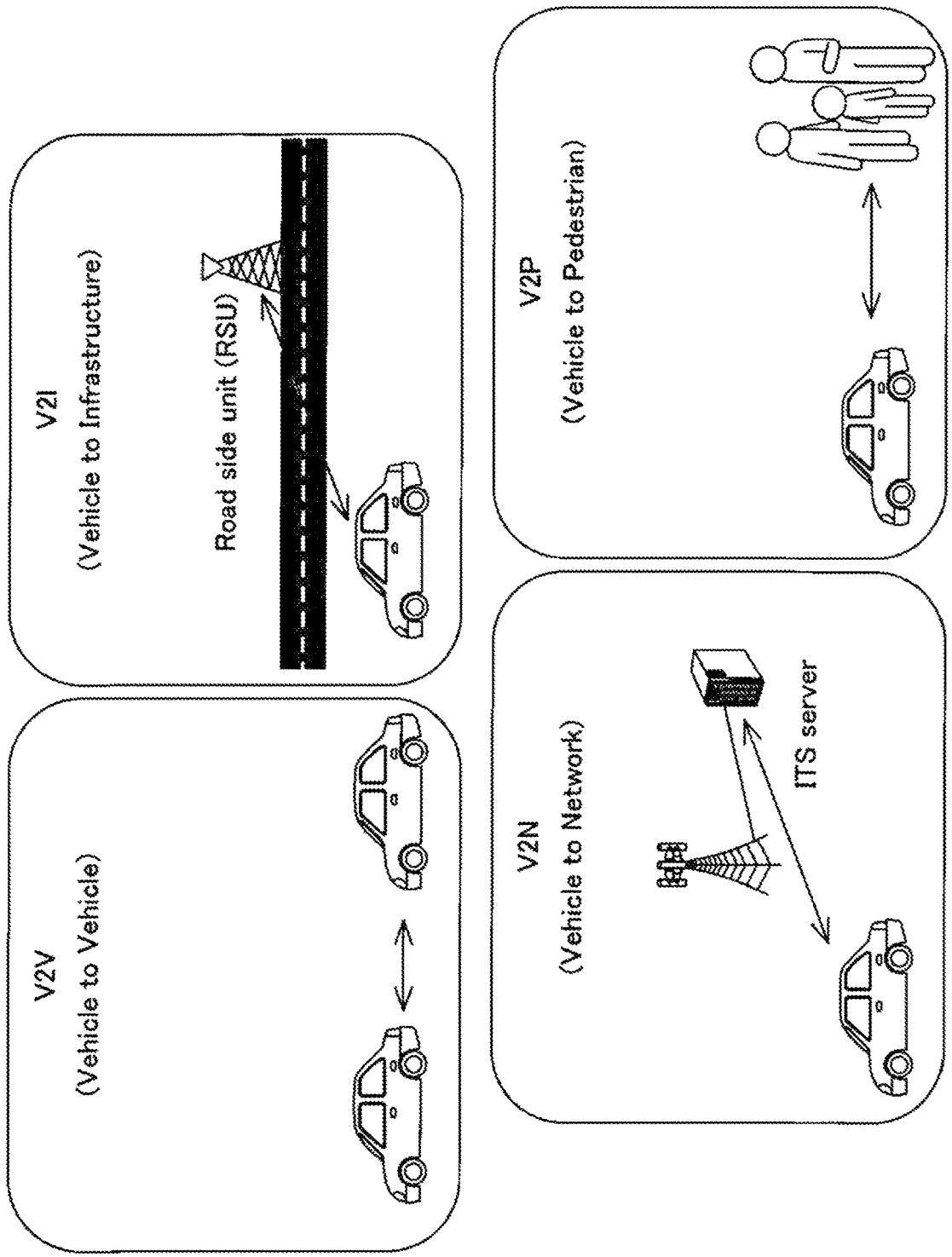
FIG. 1 is a diagram illustrating V2X.

FIG. 1 is a diagram for illustrating V2X. In 3GPP, D2D function is being extended to realize Vehicle to Everything (V2X) or enhanced V2X (eV2X) and the specification is being promoted. As shown in FIG. 1, V2X is a collective term for Vehicle to Vehicle (V2V), which is a part of ITS (Intelligent Transport Systems), which means a form of communication between vehicles, Vehicle to Infrastructure (V2I), which means a form of communication between vehicles and roadside equipment (RSU: Road-Side Unit), Vehicle to Network (V2N), which means a form of communication between vehicles and ITS servers, and Vehicle to Pedestrian (V2P), which means a form of communication between vehicles and mobile terminals carried by pedestrians.

In addition, V2X using LTE or NR cellular communication and terminal-to-terminal communication is under review in 3GPP. V2X using cellular communication is also called cellular V2X. NR's V2X is being studied for realizing large capacity, low delay, high reliability, and QoS (Quality of Service) control.

It is anticipated that V2X of LTE or NR will be studied not only in 3GPP specification but also in the future. For example, it is envisaged that interoperability, cost reduction by upper layer implementation, Radio Access Technology (RAT) combination or switching methods, regulatory compliance in each country, and data acquisition, distribution, database management and utilization method by LTE or NR V2X platforms will be considered.

In embodiments of the present invention, it is primarily assumed that a communication device is mounted on a vehicle, but embodiments of the present invention are not limited to such embodiments. For example, a communication device may be a terminal carried by a person, or a communication device may be a drone or airplane mounted device, or a communication device may be a base station, an RSU, a relay station (relay node), a terminal having scheduling capability, or the like.

Note that Sidelink (SL) may be distinguished from Uplink (UL) or Downlink (DL) on the basis of any one of the following 1)-4) or combinations. SL may also be another name.
1) Resource allocation in time domain
2) Resource allocation in frequency domain
3) Synchronization signal to be referenced (including Sidelink Synchronization Signal (SLSS))
4) Reference signal used for pass-loss measurement for transmission power control Also, for SL or UL Orthogonal Frequency Division Multiplexing (OFDM), any one of Cyclic-Prefix OFDM (CP-OFDM), Discrete Fourier Transform-Spread-OFDM (DFT-S-OFDM), OFDM without Transform precoding or OFDM with Transform precoding may be applied. Also, SL operations may be performed in a multi-carrier environment.

In SL of LTE, Mode3 and Mode4 are defined for allocating SL resources to a terminal 20. In Mode3, transmission resources are dynamically allocated by Downlink Control Information (DCI) transmitted from a base station 10 to a terminal 20. In Mode3, Semi Persistent Scheduling (SPS) is also available. In Mode4, a terminal 20 autonomously selects a transmit resource from a resource pool.

Slots in embodiments of the present invention may be replaced by symbols, minislots, subframes, wireless frames, and Transmission Time Interval (TTIs). Cells in embodiments of the present invention may also be read as cell groups, carrier components, BWPs (Bandwidth parts), resource pools, resources, Radio Access Technology (RAT), systems (including wireless LANs), and the like.

Figure 2:
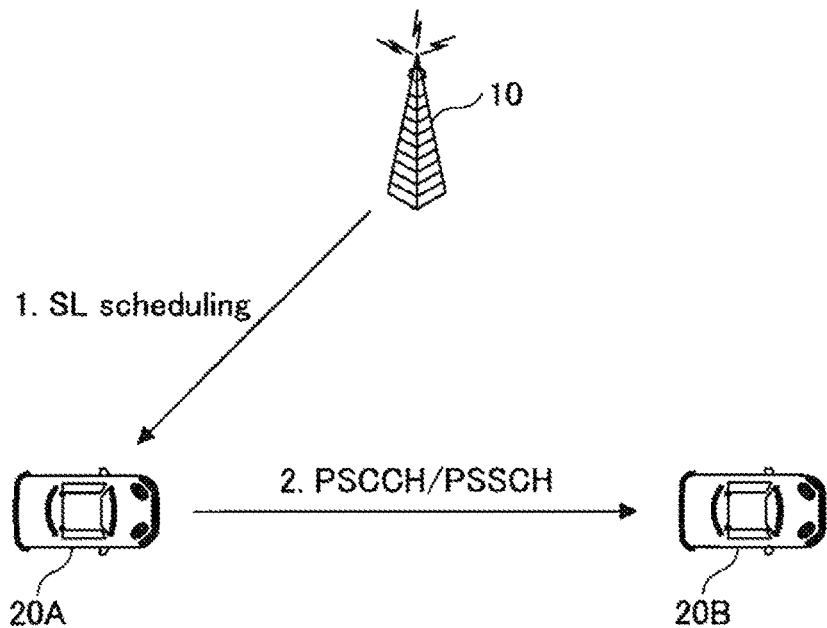
FIG. 2 is a diagram illustrating an example (1) of a transmission mode of V2X.

FIG. 2 is a diagram illustrating an example (1) of a transmission mode of V2X. In the sidelink communication transmission mode shown in FIG. 2, in step 1, a base station 10 transmits a sidelink scheduling to a terminal 20A. Subsequently, the terminal 20A transmits Physical Sidelink Control Channel (PSCCH) and Physical Sidelink Shared Channel (PSSCH) to a terminal 20B based on the received scheduling (Step 2). The transmission mode of the sidelink communication shown in FIG. 2 may be referred to as sidelink transmission mode 3 in LTE. In the sidelink transmission mode 3 in LTE, Uu-based sidelink scheduling is performed. Uu is a wireless interface between Universal Terrestrial Radio Access Network (UTRAN) and User Equipment (UE). The transmission mode of the sidelink communication shown in FIG. 2 may be referred to as sidelink transmission mode 1 in NR.

Figure 3:
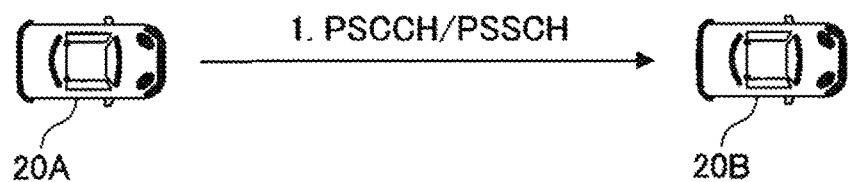
FIG. 3 is a diagram illustrating an example (2) of a transmission mode of V2X.

FIG. 3 is a diagram illustrating an example (2) of a transmission mode of V2X. In the sidelink communication transmission mode shown in FIG. 3, in step 1, a terminal 20A transmits PSCCH and PSSCH to a terminal 20B using autonomously selected resources. The transmission mode of the sidelink communication shown in FIG. 3 may be referred to as sidelink transmission mode 4 in LTE. In the sidelink transmission mode 4 in LTE, the UE itself performs resource selection.

Figure 4:
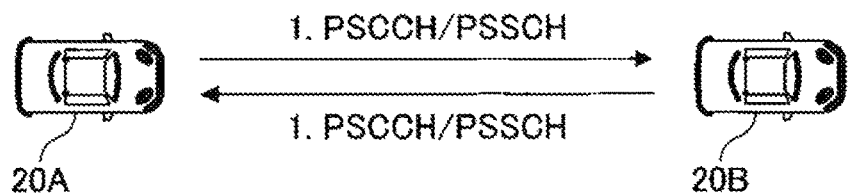
FIG. 4 is a diagram illustrating an example (3) of a transmission mode of V2X.

FIG. 4 is a diagram for illustrating an example (3) of a transmission mode of V2X. In the sidelink communication transmission mode shown in FIG. 4, in step 1, a terminal 20A transmits PSCCH and PSSCH to a terminal 20B using autonomously selected resources. Similarly, the terminal 20B transmits PSCCH and PSSCH to the terminal 20A using autonomously selected resources (step 1). The transmission mode of the sidelink communication shown in FIG. 4 may be referred to as sidelink transmission mode 2a in NR. In the sidelink transmission mode 2 in NR, the terminal 20 itself performs resource selection.

Figure 5:
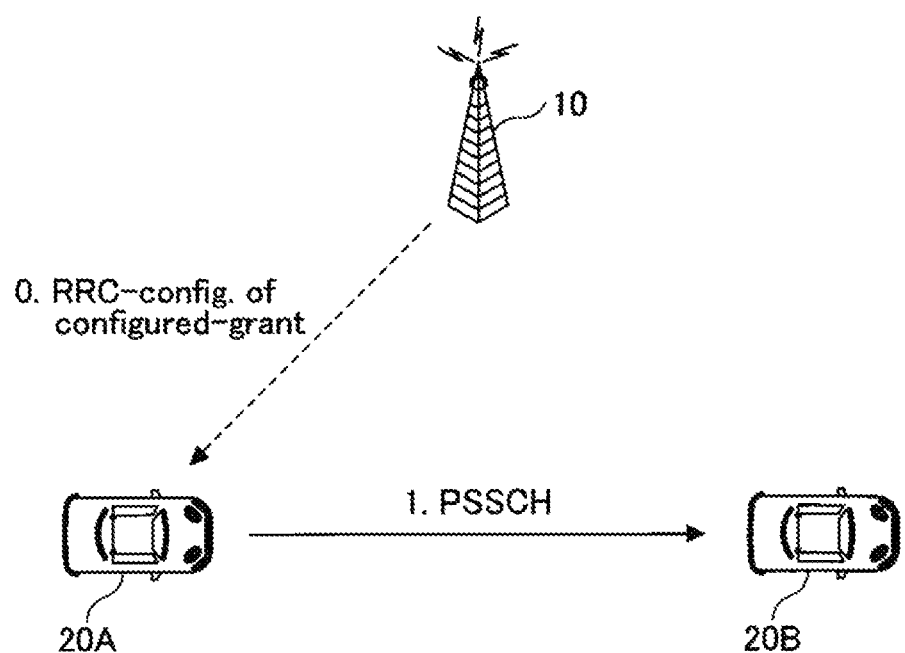
FIG. 5 is a diagram illustrating an example (4) of a transmission mode of V2X.

FIG. 5 is a diagram for illustrating an example (4) of a transmission mode of V2X. In the side-link communication transmission mode shown in FIG. 5, in step 0, a base station 10 transmits the side-link grant to a terminal 20A via the Radio Resource Control (RRC) configuration. Subsequently, in Step 1, the terminal 20A transmits PSSCH to a terminal 20B based on the received resource pattern. The transmission mode of the sidelink communication shown in FIG. 5 may be referred to as sidelink transmission mode 2c in NR.

Figure 6:
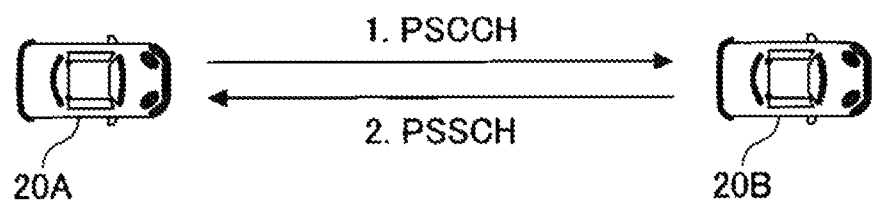
FIG. 6 is a diagram illustrating an example (5) of a transmission mode of V2X.

FIG. 6 is a diagram for illustrating an example (5) of a transmission mode of V2X. In the side-link communication transmission mode shown in FIG. 6, in step 1, a terminal 20A transmits the side-link scheduling to a terminal 20B via the PSCCH. Subsequently, in Step 2, the terminal 20B transmits PSSCH to the terminal 20A based on the received scheduling. The transmission mode of the sidelink communication shown in FIG. 6 may be referred to as sidelink transmission mode 2d in NR.

Figure 7:
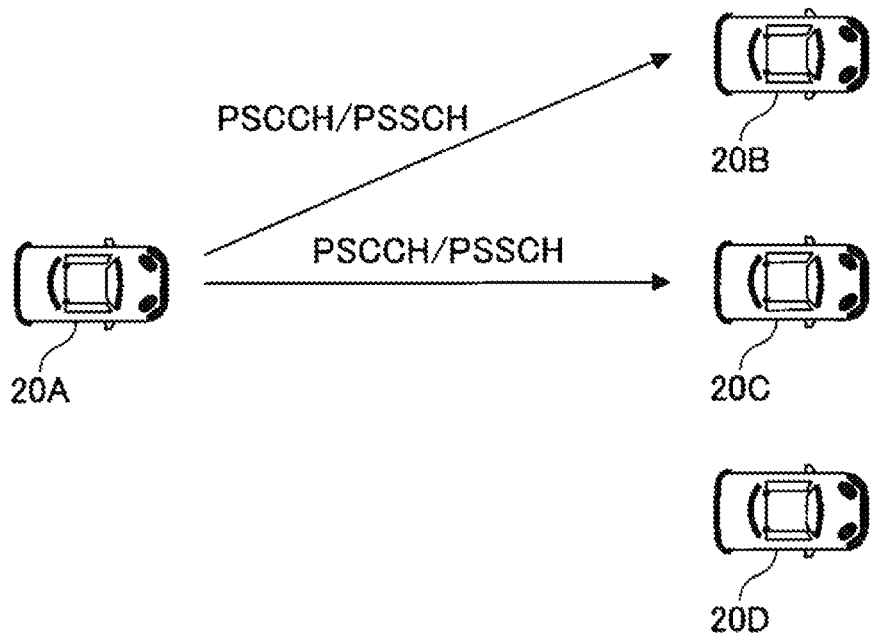
FIG. 7 is a diagram illustrating an example (1) of a communication type of V2X.

FIG. 7 is a diagram for illustrating an example (1) of a communication type of V2X. The sidelink communication type shown in FIG. 7 is unicast. A terminal 20A transmits PSCCH and PSSCH to terminal 20. In the example shown in FIG. 7, the terminal 20A unicasts a terminal 20B and unicasts a terminal 20C.

Figure 8:
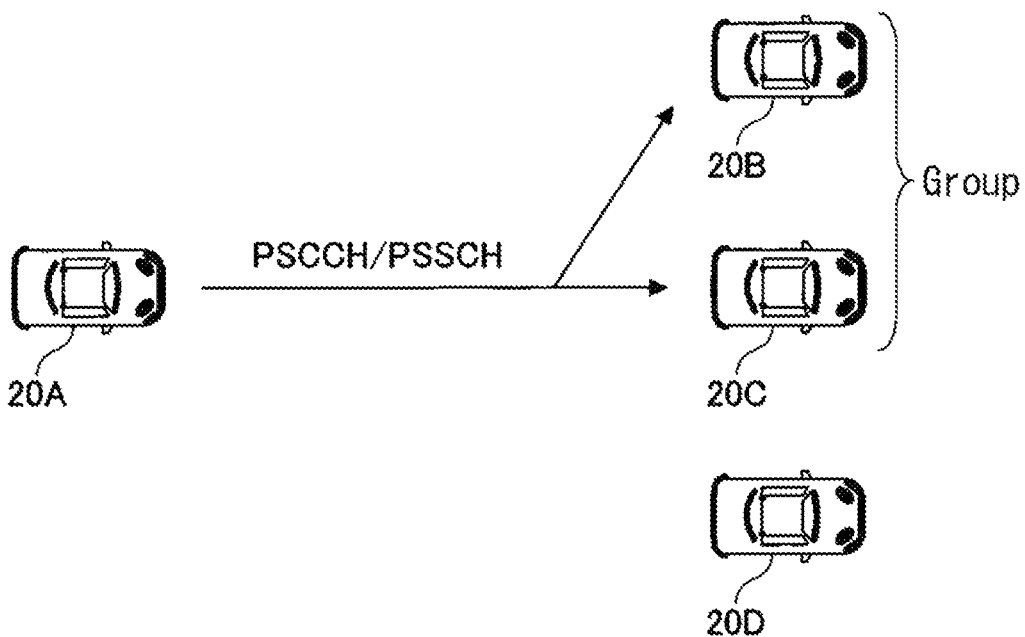
FIG. 8 is a diagram illustrating an example (2) of a communication type of V2X.

FIG. 8 is a diagram for illustrating an example (2) of a communication type of V2X. The sidelink communication type shown in FIG. 8 is a group cast. A terminal 20A transmits PSCCH and PSSCH to a group to which one or more terminals 20 belong. In the example shown in FIG. 8, the group includes a terminal 20B and a terminal 20C, and the terminal 20A performs group casting on the group.

Figure 9:
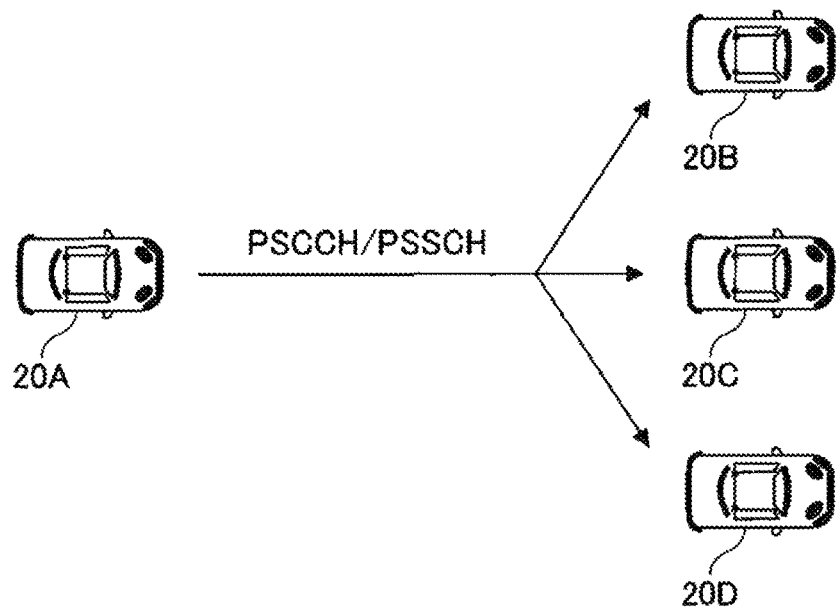
FIG. 9 is a diagram illustrating an example (3) of a communication type of V2X.

FIG. 9 is a diagram for illustrating an example (3) of a communication type of V2X. The sidelink communication type shown in FIG. 9 is broadcast. A terminal 20A transmits PSCCH and PSSCH to one or more terminals 20. In the example shown in FIG. 9, the terminal 20A broadcasts to a terminal 20B, a terminal 20C, and a terminal 20D. The terminal 20A shown in FIGS. 7 to 9 may be referred to as a header UE.

In addition, it is assumed that HARQ (Hybrid automatic repeat request) is supported for unicasts and group casts of sidelink in NR-V2X. In addition, Sidelink Feedback Control Information (SFCI) containing HARQ responses is defined in NR-V2X. In addition, SFCI transmission via Physical Sidelink Feedback Channel (PSFCH) is under review.

In the following description, PSFCH is used in a transmission of HARQ-ACK on sidelink but this is merely an example. For example, PSCCH may be used to transmit HARQ-ACK on sidelink, PSSCH may be used to transmit HARQ-ACK on sidelink, or other channels may be used to transmit HARQ-ACK on sidelink.

Hereinafter, for convenience, overall information reported by a terminal 20 in HARQ is referred to as HARQ-ACK. This HARQ-ACK may also be referred to as HARQ-ACK information. More specifically, a codebook applied to information of HARQ-ACK reported from a terminal 20 to a base station 10 or the like is called HARQ-ACK codebook. HARQ-ACK codebook defines bit strings of HARQ-ACK information. "HARQ-ACK" sends not only ACK but also NACK.

Figure 10:
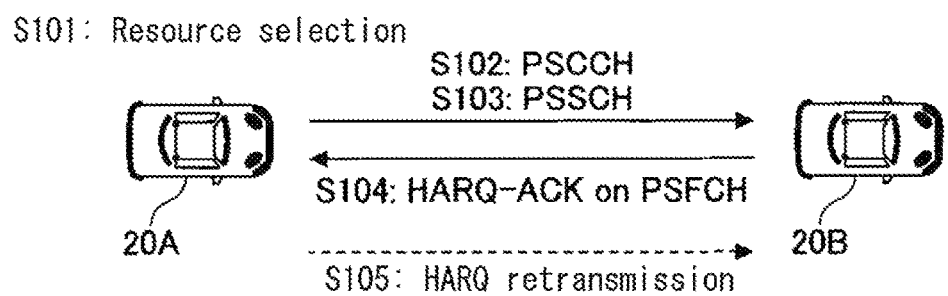
FIG. 10 is a sequence diagram illustrating an example (1) of operation of V2X.

FIG. 10 is a diagram illustrating an example (1) of a configuration and operation of a wireless communication system according to an embodiment of the present invention. As shown in FIG. 10, a wireless communication system according to an embodiment of the present invention includes a terminal 20A and a terminal 20B. In practice, there are numerous user devices, but FIG. 10 shows a terminal 20A and a terminal 20B as examples.

Hereinafter, when terminals 20A, 20B, or the like are not particularly distinguished, the term "terminal 20" or "user equipment" will be simply described. FIG. 10 illustrates, for example, a case where both a terminal 20A and a terminal 20B are within a cell coverage, but the operation according to an embodiment of the present invention can also be applied when the terminal 20B is outside of the coverage.

As described above, in this embodiment, a terminal 20 is, for example, a device mounted in a vehicle such as an automobile and has a cellular communication function as a UE in LTE or NR and a sidelink function. A terminal 20 may be a conventional portable terminal (such as a smartphone). A terminal 20 may also be an RSU. The RSU may be a UE-type RSU having a function of a UE or a gNB-type RSU having a function of a base station device.

A terminal 20 need not be a single housing device. For example, even when various sensors are dispersed in a vehicle, the device including the various sensors is the terminal 20.

A processing contents for transmission data on sidelink of a terminal 20 are basically the same as those of UL transmission in LTE or NR. For example, a terminal 20 scrambles a code word of transmitted data, modulates to generate complex-valued symbols, and maps the complex-valued symbols to one or two layers and performs precoding. The precoded complex-valued symbols are then mapped to a resource element to generate a transmission signal (e.g., complex-valued time-domain SC-FDMA signal) and transmit it from each antenna port.

A base station 10 has a function of cellular communication as a base station in LTE or NR and a function of enabling communication of the terminal 20 according to the present embodiment (e.g., resource pool setting, resource allocation, etc.). A base station 10 may also be an RSU (gNB-type RSU).

In a wireless communication system according to an embodiment of the present invention, a signal waveform used by a terminal 20 for SL or UL may be OFDMA, SC-FDMA, or another signal waveform.

In step S101, a terminal 20A autonomously selects resources to be used for PSCCH and PSSCH from a resource selection window having a predetermined period. The resource selection window may be configured from a base station 10 to a terminal 20.

In Step S102 and Step S103, the terminal 20A transmits Sidelink Control Information (SCI) via PSCCH and transmits SL data via PSSCH by using the resources autonomously selected in Step S101. For example, the terminal 20A may transmit the SCI (PSCCH) using frequency resources adjacent to the PSSCH frequency resources with the same time resources of the PSSCH.

A terminal 20B receives the SCI (PSCCH) and the SL data (PSSCH) transmitted from the terminal 20A. The SCI received via the PSCCH may include information about a PSFCH resource for the terminal 20B to send HARQ-ACK for reception of the data. The terminal 20A may include information of the autonomously selected resource in the SCI and perform transmission.

In step S104, the terminal 20B transmits HARQ-ACK for the received data to the terminal 20A using the PSFCH resource specified by the received SCI.

In step S105, when the HARQ-ACK received in step S104 requests retransmission, i.e. the HARQ-ACK is a NACK (negative response), the terminal 20A retransmits the PSCCH and PSSCH to the terminal 20B. The terminal 20A may retransmit PSCCH and PSSCH using autonomously selected resources.

If HARQ control is not performed, step S104 and step S105 need not be performed.

Figure 11:
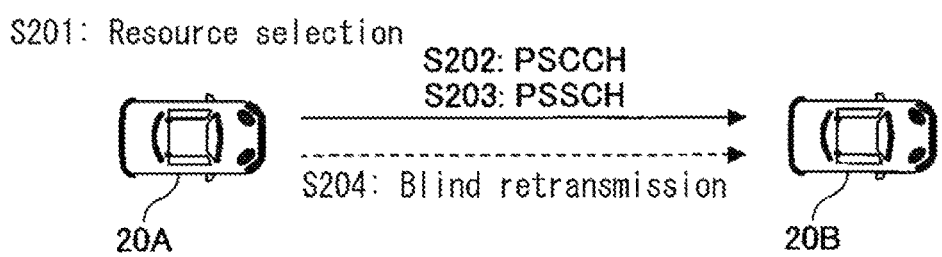
FIG. 11 is a sequence diagram illustrating an example (2) of operation of V2X.

FIG. 11 is a diagram illustrating an example (2) of the configuration and operation of a wireless communication system according to an embodiment of the present invention. Blind retransmissions without HARQ control may be performed to improve the transmission success rate or distance reached.

In step S201, a terminal 20A autonomously selects resources to be used for PSCCH and PSSCH from a resource selection window having a predetermined period. The resource selection window may be configured by a base station 10 to a terminal 20.

In Step S202 and Step S203, the terminal 20A transmits SCI via PSCCH and transmits SL data via PSSCH by using the resources autonomously selected in Step S201. For example, the terminal 20A may transmit the SCI (PSCCH) using frequency resources adjacent to the PSSCH frequency resources with the same time resources of the PSSCH.

In step S204, the terminal 20A retransmits the SCI via PSCCH and the SL data via PSSCH to the terminal 20B by using the resources autonomously selected in step S201. Retransmissions in step S204 may be performed multiple times.

If blind retransmission is not performed, step S204 need not be performed.

Figure 12:
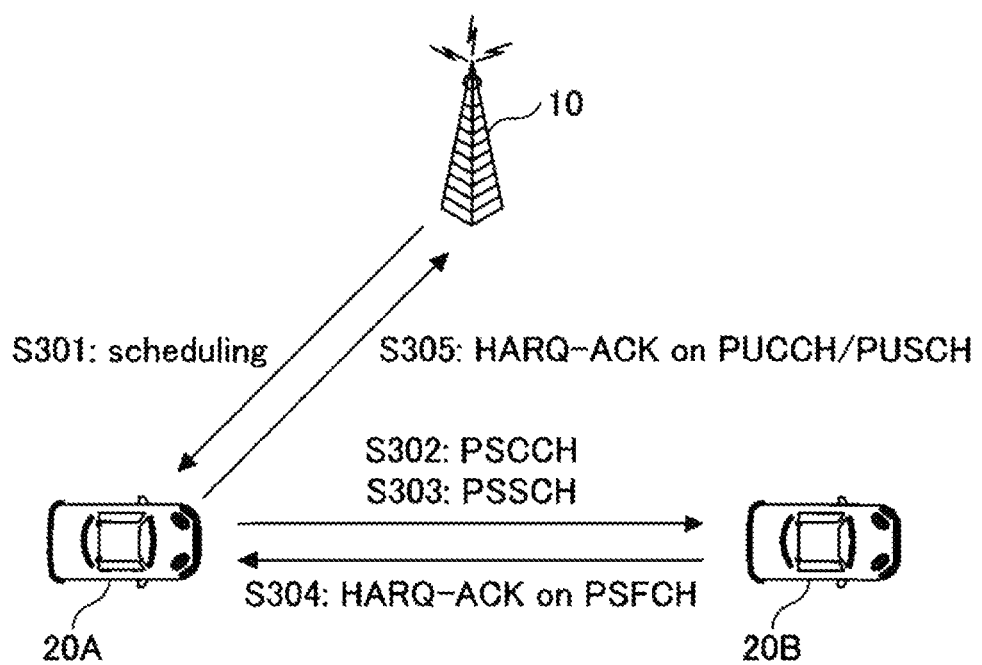
FIG. 12 is a sequence diagram illustrating an example (3) of operation of V2X.

FIG. 12 is a diagram illustrating an example (3) of the configuration and operation of a wireless communication system according to an embodiment of the present invention. A base station 10 may schedule sidelink. That is, a base station 10 may determine sidelink resources to be used by a terminal 20 and transmit information indicating the resources to the terminal 20. In addition, when HARQ control is applied, a base station 10 may transmit information indicating a PSFCH resource to the terminal 20.

In step S301, a base station 10 performs SL scheduling by sending Downlink Control Information (DCI) to a terminal 20A via PDCCH. Hereafter, for convenience, the DCI for SL scheduling is referred to as SL scheduling DCI.

In step S301, it is also assumed that a base station 10 transmits DCI for DL scheduling (may be referred to as DL assignment) to a terminal 20A via the PDCCH. Hereafter, for convenience, the DCI for DL scheduling is referred to as DL scheduling DCI. The terminal 20A that receives the DL scheduling DCI receives the DL data via the PDSCH by using the resources specified by the DL scheduling DCI.

In step S302 and step S303, the terminal 20A transmits the SCI (Sidelink Control Information) via PSCCH by using the resources specified by the SL scheduling DCI and transmits the SL data via PSSCH. Note that in SL scheduling DCI, only PSSCH resources may be specified. In this case, for example, the terminal 20A may transmit the SCI (PSCCH) using frequency resources adjacent to the PSSCH frequency resources with the same time resources of the PSSCH.

A terminal 20B receives the SCI (PSCCH) and the SL data (PSSCH) transmitted from the terminal 20A. The SCI received via the PSCCH includes information about a PSFCH resource for the terminal 20B to send HARQ-ACK for reception of the data.

The information of the resource is included in DL scheduling DCI or SL scheduling DCI transmitted from the base station 10 in step S301, and the terminal 20A acquires the information of the resource from the DL scheduling DCI or the SL scheduling DCI and includes it in the SCI. Alternatively, the DCI transmitted from the base station 10 does not include the information of the resource, and the terminal 20A may autonomously include the information of the resource in the SCI and transmit the information of the resource.

In step S304, the terminal 20B transmits a HARQ-ACK for the received data to the terminal 20A using the PSFCH resources specified by the received SCI.

In step S305, the terminal 20A transmits a HARQ-ACK using PUCCH (Physical uplink control channel) resources specified by the DL scheduling DCI (or the SL scheduling DCI) at the timing (e.g., slot-by-slot timing) specified by the DL scheduling DCI (or the SL scheduling DCI), and the base station 10 receives the HARQ-ACK. The HARQ-ACK codebook may include a HARQ-ACK received from the terminal 20B and a HARQ-ACK for DL data. However, HARQ-ACK for DL data is not included if DL data is not allocated.

If HARQ control is not performed, step S304 and step S305 need not be performed.

Figure 13:
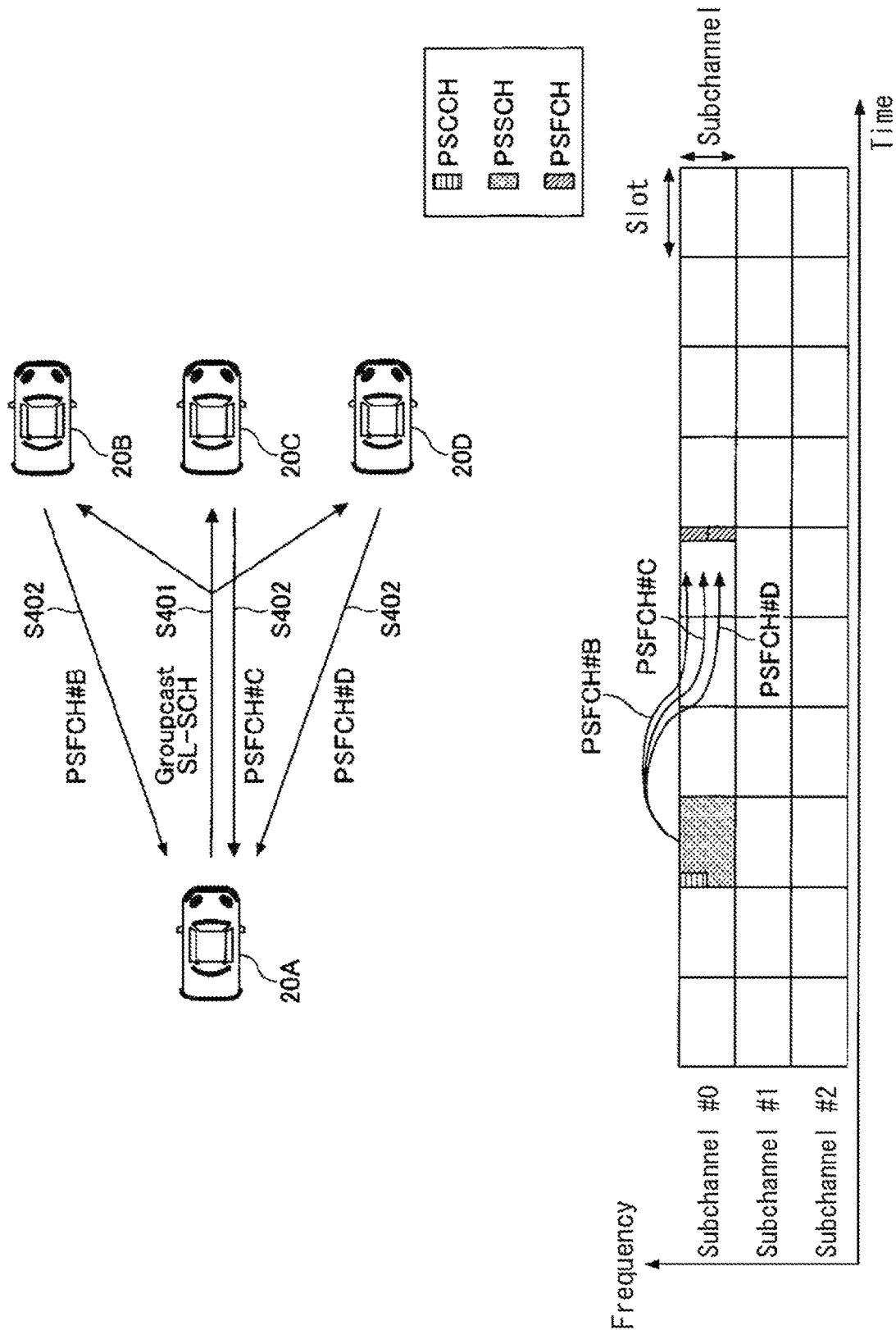
FIG. 13 is a sequence diagram illustrating an example (4) of operation of V2X.

FIG. 13 is a diagram illustrating an operation example (4) according to an embodiment of the present invention. As noted above, it is supported that HARQ responses are sent by PSFCH on the sidelink of NR. The format of PSFCH can be the same as that of PUCCH (Physical Uplink Control Channel) format 0. That is, the PSFCH format may be a sequence-based format with: a PRB (Physical Resource Block) size of 1; and ACK and NACK identified by sequence differences. The format of PSFCH is not limited to the above-described format. The PSFCH resources may be located at one or more trailing symbols of a slot. Whether the period N is configured for the PSFCH resource or not, may be specified in advance. The period N may be configured or predefined based on a slot unit.

In FIG. 13, the vertical axis corresponds to frequency domain and the horizontal axis corresponds to time domain. The PSCCH may be allocated: in one symbol at the beginning of the slot; in a plurality of symbols starting from the beginning of the slot; or in a plurality of symbols starting from another symbol of the slot. The PSFCH may be allocated at one symbol at the end of the slot or at multiple symbols at the end of the slot. In the example shown in FIG. 13, three subchannels are configured to the resource pool, and two PSFCHs are placed in a slot three slots after the slot in which the PSSCH is placed. The arrows from PSSCH to PSFCHs indicate an example of PSFCHs associated with PSSCH.

If the HARQ response in the NR-V2X group cast is an option 2 to send an ACK or NACK, the resource used for sending and receiving PSFCH must be determined. As shown in FIG. 13, in step S401, the terminal 20A, which is the transmitting side terminal 20, performs a group cast to the terminal 20B, the terminal 20C, and the terminal 20D, which are the receiving side terminals 20, via the SL-SCH. In step S402, the terminal 20B uses PSFCH #B, the terminal 20C uses PSFCH #C, and the terminal 20D uses PSFCH #D to transmit a HARQ response to the terminal 20A. Here, as shown in the example of FIG. 13, if the number of PSFCH resources available is less than the number of receiving side terminals 20 belonging to the group, it is necessary to determine how to allocate PSFCH resources. The sending side terminal 20 may have obtained in advance the number of the receiving side terminals 20 in the group cast.

Figure 14:
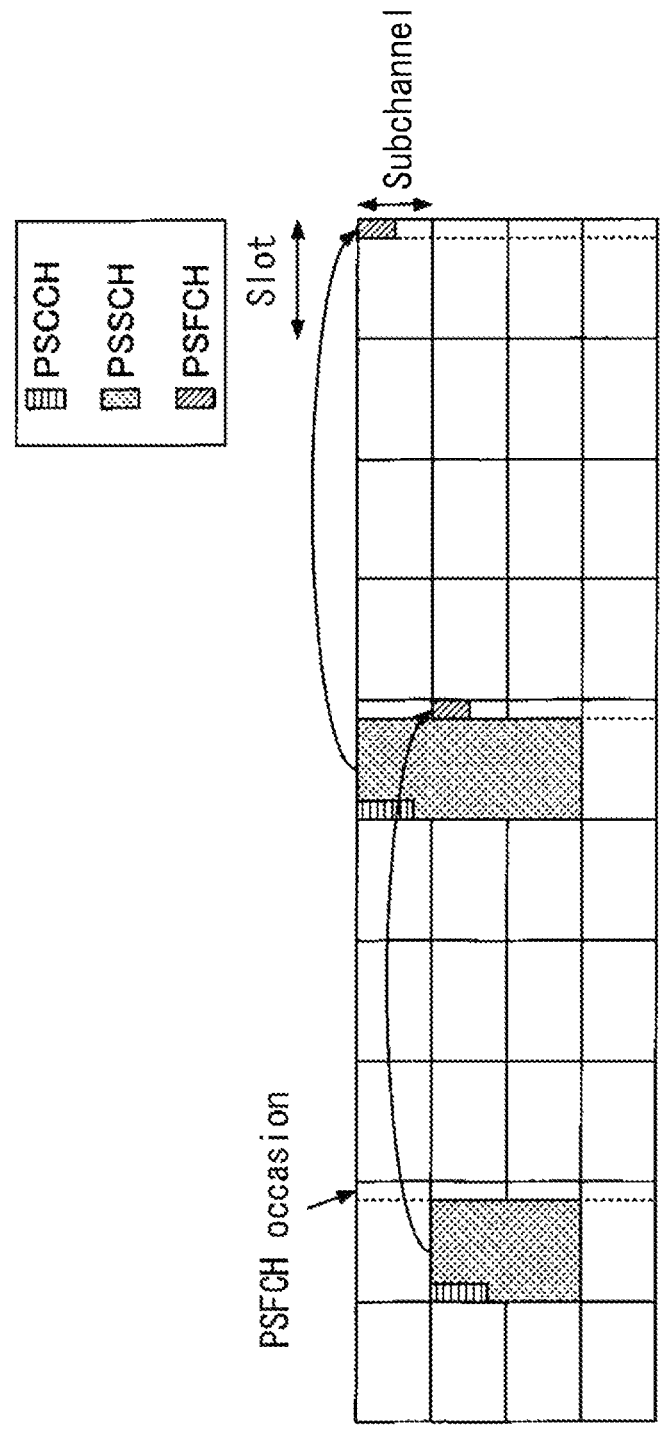
FIG. 14 is a diagram showing an example of HARQ response.

FIG. 14 is a diagram illustrating an example of a HARQ response. In NR Sidelink Release 16, frequency division multiplexing (FDM) between PSFCH and PSCCH/PSSCH is not supported in the sidelink. As shown in FIG. 14, PSFCH is transmitted with a different symbol from PSCCH/PSSCH. In PSFCH, only HARQ responses are sent.

Therefore, among PSFCH opportunities, resources not used for sending and receiving HARQ responses, remain unused, and resource usage efficiency decreases. In order to improve resource usage efficiency, it is desirable to use frequency resources, which are not used to transmit and receive HARQ responses, for other purposes, among the symbols, in which the PSFCHs used to transmit and receive HARQ responses, are located.

Therefore, we propose a method of using resources for specific channels and/or signals, the resources having: time resources (e.g., symbols) used by PSFCHs for HARQ responses; and frequency resources not used by PSFCHs for HARQ responses.

Figure 15:
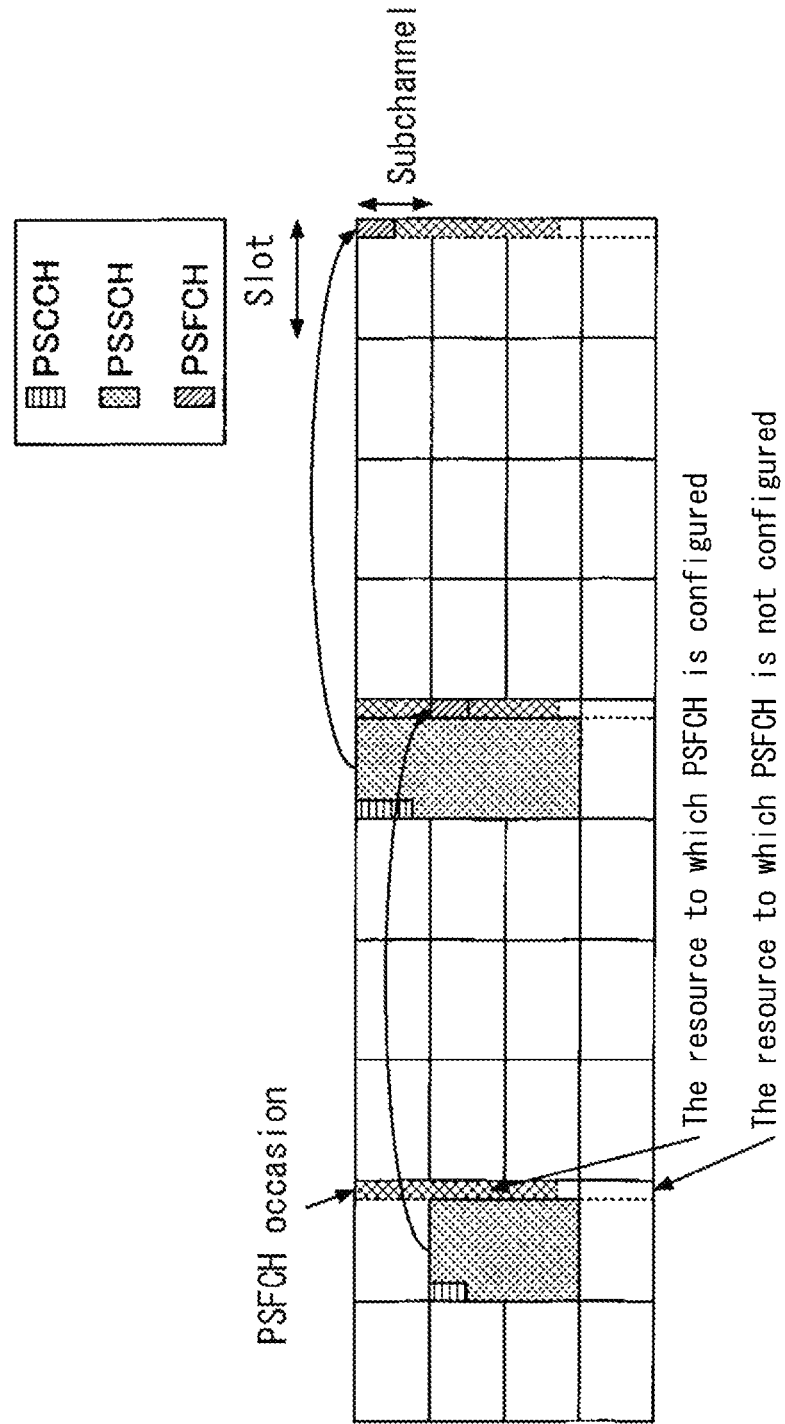
FIG. 15 is a diagram illustrating an example (1) of a resource allocation for a HARQ response according to an embodiment of the present invention.

FIG. 15 is a diagram illustrating an example (1) of a resource allocation related to a HARQ response in an embodiment of the present invention. Frequency resources that are not used for PSFCH may be any of the following 1) and 2).

1) The frequency resources that are not used for PSFCH, may be those resources to which PSFCH is not configured (pre-configuration or configuration) as shown in FIG. 15. The frequency resources may be represented, for example, by PRBs, subchannels, BWPs, resource pools, carriers, frequency ranges, etc.

2) The frequency resources that are not used by PSFCH, may be those resources to which PSFCH is configured as shown in FIG. 15 and via which PSFCH is not to be sent. Alternatively, the frequency resources that are not used by PSFCH, may be frequency resources other than the resources via which PSFCH is to be transmitted, regardless of whether PSFCH is configured to the resources. The frequency resources may be represented, for example, by PRBs, subchannels, BWPs, resource pools, carriers, frequency ranges, etc.

The frequency resources not used for PSFCH, may be used for any of the channels and/or signals in 1), 2) and 3) below.

1) RS (Reference Signal)

For example, the reference signal may be PSCCH DM-RS (Demodulation-RS), PSSCH DM-RS, PSFCH DM-RS, CSI-RS (Channel state information-RS), or PT-RS (Phase tracking-RS). The reference signal may also be a reference signal used for demodulation, a reference signal used for obtaining channel status, a reference signal used for beam control, or a reference signal used for phase correction.

2) PSCCH and/or PSSCH

For example, the PSCCH and/or PSSCH may comprise at least one of the following a), b) and c).

a) Signal to Reserve Future Resources (the Pre-Reservation Signal)

Figure 16:
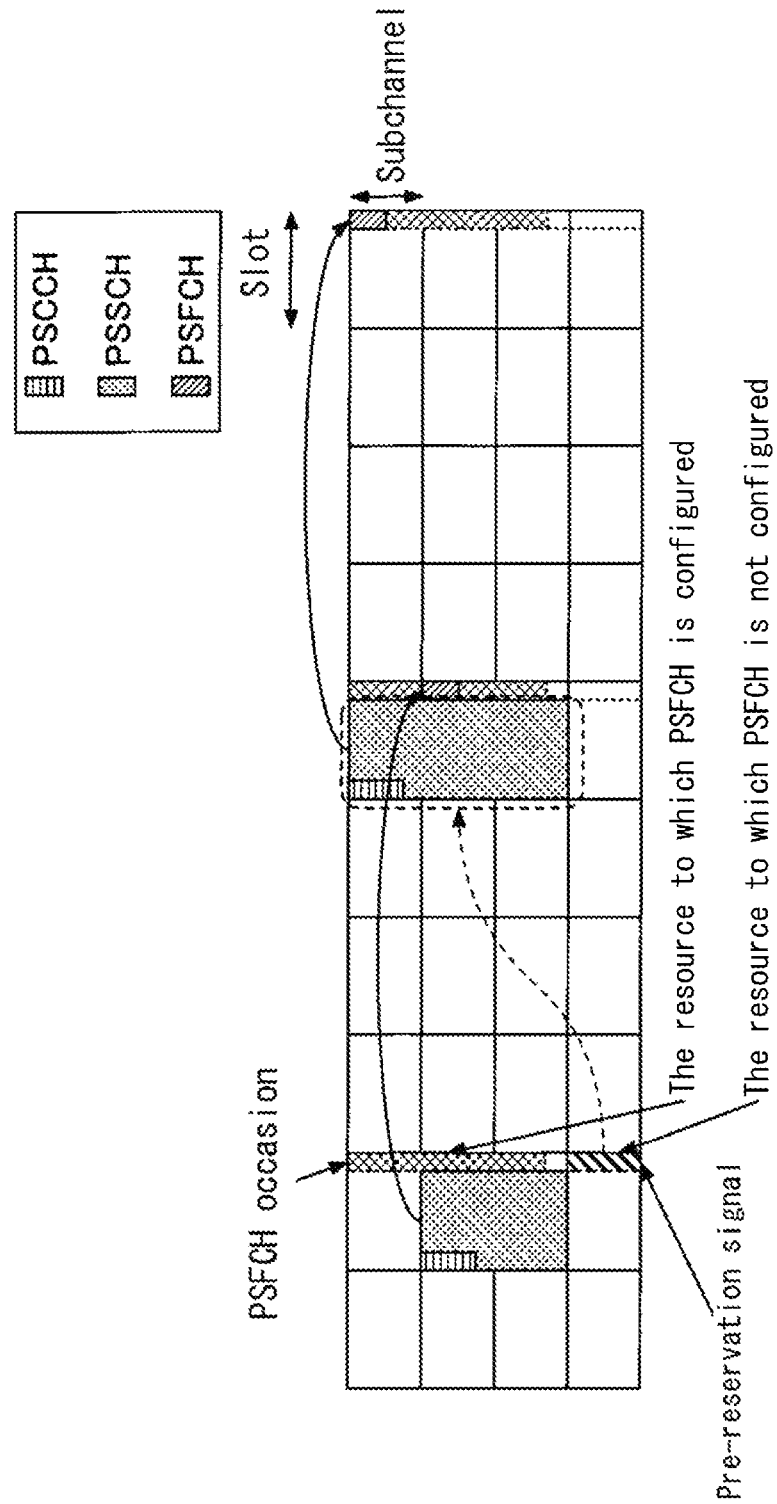
FIG. 16 is a diagram illustrating an example (2) of a resource allocation for a HARQ response according to an embodiment of the present invention.

FIG. 16 is a diagram illustrating an example (2) of a resource allocation related to a HARQ response in an embodiment of the present invention. As shown in FIG. 16, frequency resources not used for PSFCH, may be used for a signal to reserve future resources. In the example shown in FIG. 16, the reserved resources are three subchannels in the fourth slot after the signal. Resources in subchannels, which are different from the subchannel in which the signal is transmitted, may be reserved, or resources in a different number of subchannels, the different number being different from a number of subchannels in which the signal is transmitted, may be reserved. In FIG. 16 in the PSFCH occasion, the signal is allocated to a resource to which PSFCH is not configured, but the signal may be allocated to a resource to which PSFCH is configured but PSFCH is not to be transmitted, or the signal may be allocated to a frequency resource other than a resource via which PSFCH is to be transmitted, regardless of whether PSFCH is configured to the resource or not.

b) All or a Part of a Transport Block

For example: all or a part of a transport block transmitted in a frequency resource not used for PSFCH in the PSFCH opportunity shown in FIG. 16; or a transport block that does not require a HARQ response, may be included.

c) CSI

For example, the CSI may include at least one of CQI (Channel Quality Indicator), RI (Rank Indicator), PMI (Precoding matrix Indicator), LI (Layer Indicator), and RSRP (Reference Signal Received Power).

Also, for example, the HARQ response corresponding to the PSCCH and/or PSSCH need not be generated, and the PSFCH resource corresponding to the PSCCH and/or PSSCH need not be configured.

Figure 17:
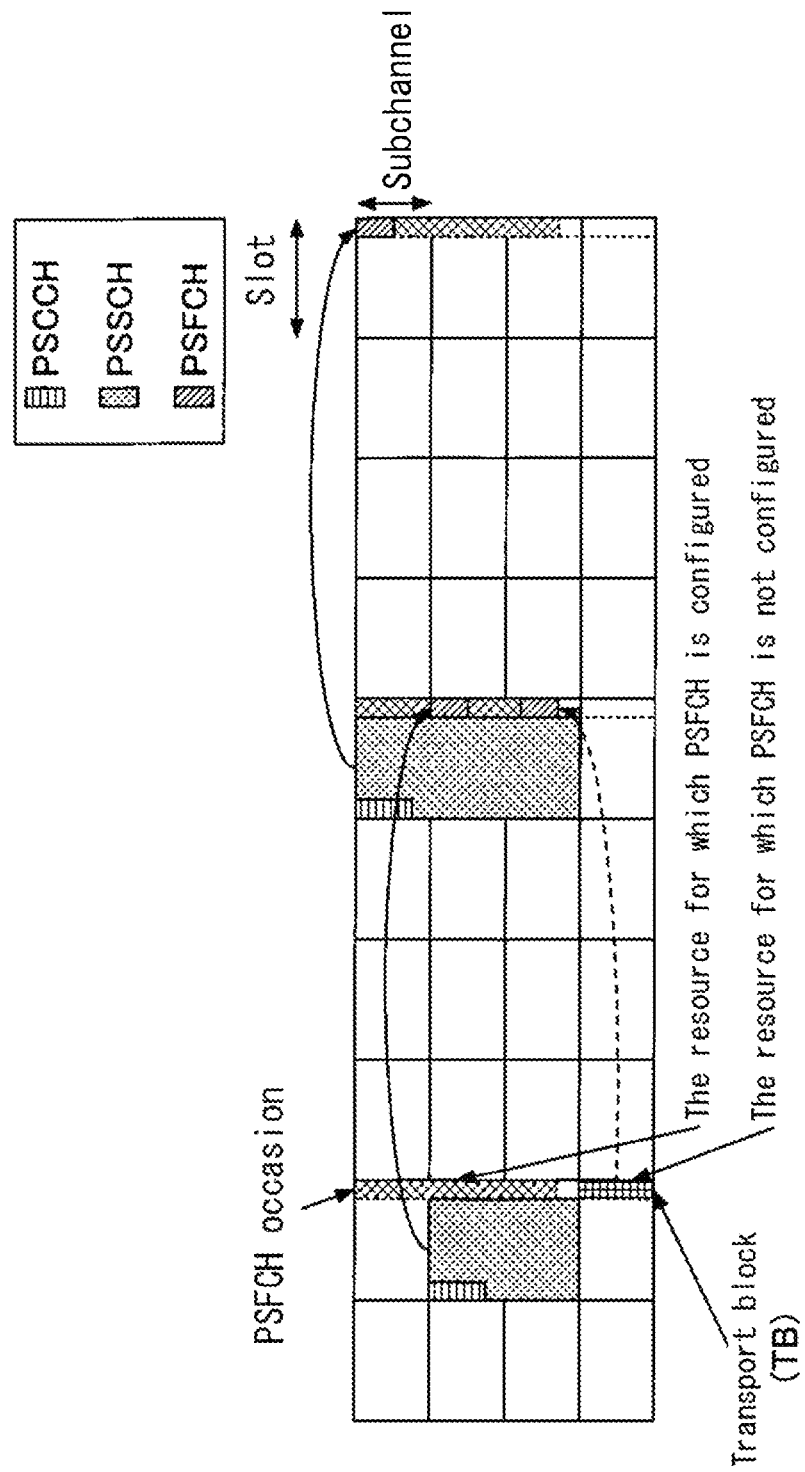
FIG. 17 is a diagram illustrating an example (3) of a resource allocation for a HARQ response according to an embodiment of the present invention.

Also, for example, PSFCH resources corresponding to at least one of the PSCCH and PSSCH may be configured, and HARQ responses corresponding to at least one of the PSCCH and PSSCH may be transmitted and received. FIG. 17 is a diagram illustrating an example (3) of a resource allocation related to a HARQ response according to an embodiment of the present invention. As shown in FIG. 17, PSFCH corresponding to at least a part of the transport block allocated on at least one of the PSCCH and the PSSCH may be configured, and a corresponding HARQ response may be transmitted and received. In FIG. 17, in the PSFCH occasion, the transport block is allocated in a resource to which PSFCH is not configured. However, the transport block may be allocated in a resource to which PSFCH is configured and PSFCH is not to be transmitted, or the transport block may be allocated in a frequency resource other than a resource in which PSFCH is to be transmitted, regardless of whether PSFCH is configured to the resource or not.

3) PSFCH Used for Purposes Other than HARQ Responses

For example, at least one of a) b) and c) may be included.

a) CSI (e.g., at least one of a CQI, RI, PMI, LI, RSRP)

b) SR (Scheduling request)

c) Signals (for example, beam failure indication) for BFR (e.g., beam failure recovery)

Also, for example, if the PSFCH transmission used for purposes other than the HARQ response overlaps the PSFCH transmission of the HARQ response, at least some information may be multiplexed into the PSFCH resource. Hereinafter, "overlap" corresponds to overlapping of resources mainly in time domain, but "overlap" may correspond to overlapping of resources in at least one of time domain, frequency domain, or code domain.

Also, for example, if a PSFCH transmission used for a purpose other than a HARQ response overlaps a PSFCH transmission of a HARQ response, one of the transmissions may be dropped based on a configured or predefined priority. For example, the transmission of a HARQ response may be prioritized over the transmission other than a HARQ response. For example, priority may be configured or predefined for CSI, SR and BFR transmission, respectively.

Also, for example, if a PSFCH transmission or reception used for a purpose other than a HARQ response overlaps PSFCH reception or transmission of a HARQ response, respectively, either transmission or reception of the former or the latter may be dropped based on a configured or predefined priority. For example, transmission and reception of HARQ responses may be prioritized over transmission and reception of purposes other than HARQ responses. For example, priority may be configured or predefined for sending and receiving CSIs, SRs and BFRs, respectively.

Figure 18:
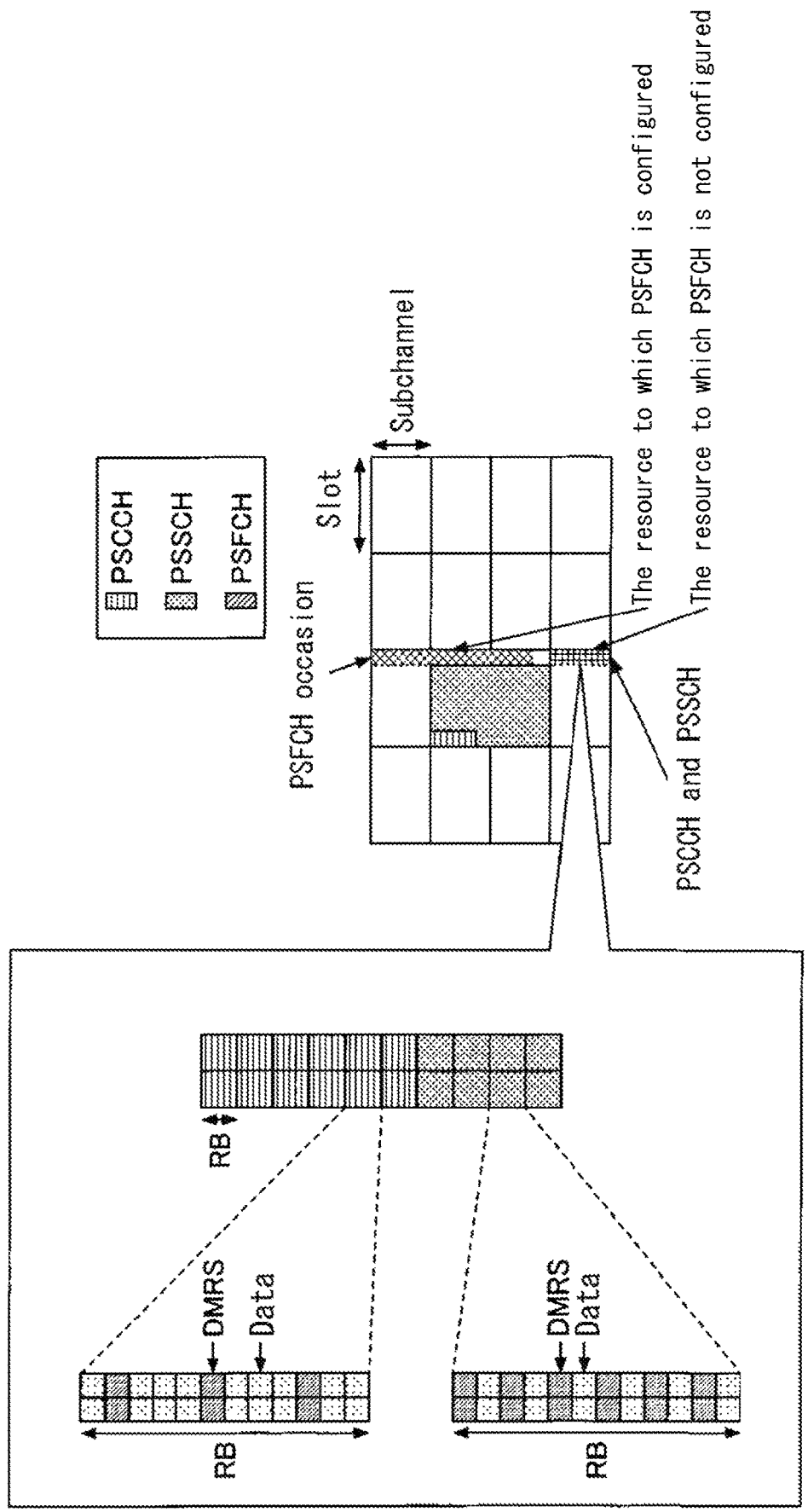
FIG. 18 is a diagram illustrating an example (1) of a resource configuration for a HARQ response according to an embodiment of the present invention.
Figure 19:
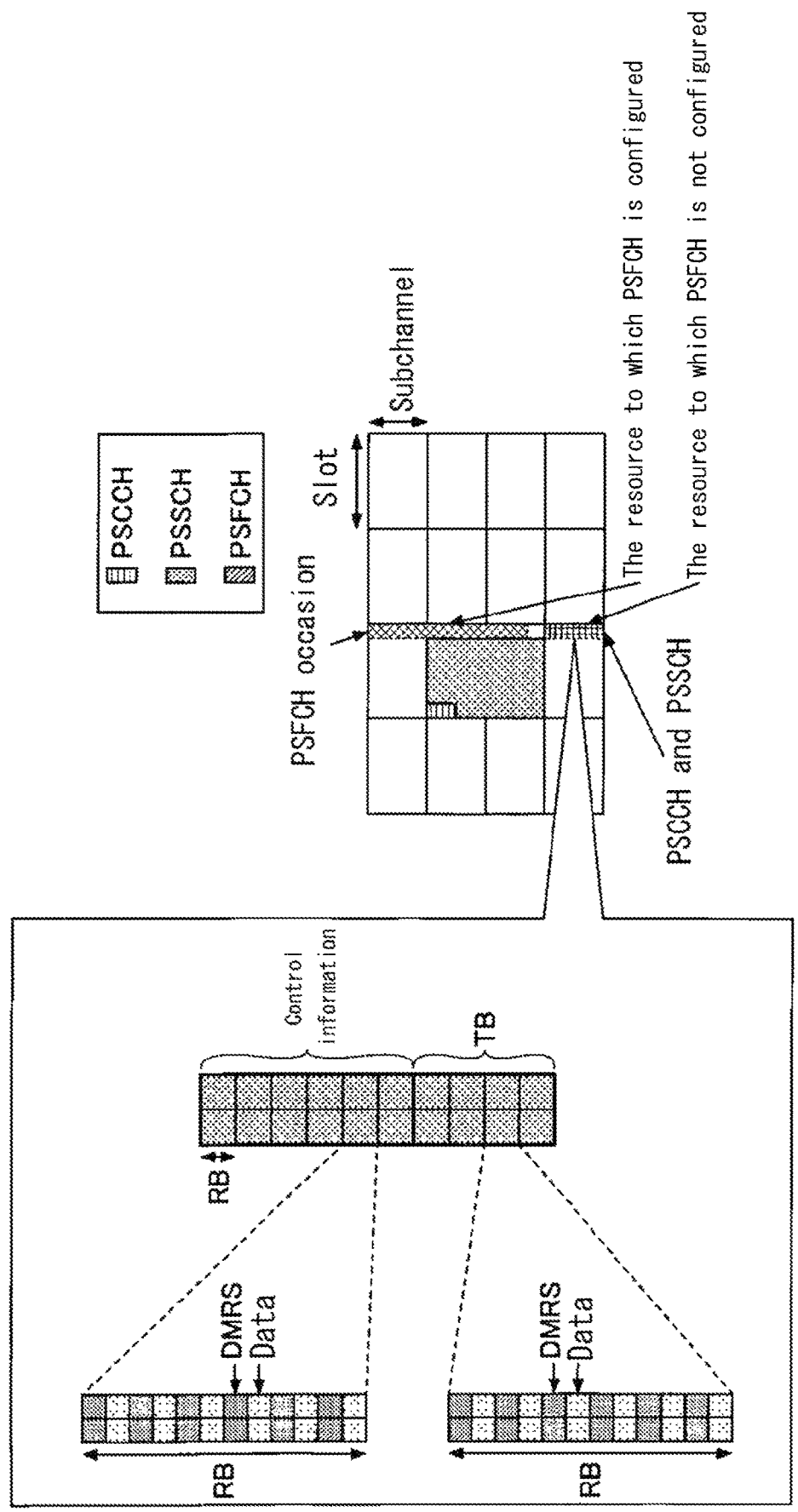
FIG. 19 is a diagram illustrating an example (2) of a resource configuration for a HARQ response according to an embodiment of the present invention.

In a case where PSCCH and/or PSSCH are allocated in frequency resources not used for PSFCH, the PSCCH and/or PSSCH may be configured as shown in FIG. 18 or 19.

FIG. 18 is a diagram illustrating an example (1) of a resource configuration for a HARQ response according to an embodiment of the present invention. FIG. 18 is an example in which PSCCH and PSSCH are allocated in frequency resources that are not used for PSFCH. PSCCH may be repeated in a time direction with a single-symbol PSCCH having the same configuration as conventional two or three-symbol PSCCH in the frequency direction. The same configuration as the conventional two or three-symbol PSCCH may be one in which the 3 REs of the PSCCH data and the 1 RE of the DMRS are repeated at an interval of 4 REs, as shown, for example, in the resource block of PSCCH in FIG. 18. The data and DMRS allocations are exemplary and may be other allocations.

PSSCH may have a similar configuration as the PSCCH part, and may be placed in resources other than those in which PSCCH is located, among those frequency resources not used for PSFCH. For example, the configuration of the PSSCH may be the same as that of the PSCCH part, or one RE of the PSSCH data and one RE of the DMRS may be repeated at an interval of two REs, as shown in the resource block of PSSCH in FIG. 18. The data and DMRS allocations are exemplary and may be other allocations. For example, the 2 REs of the PSSCH data and the 2 REs of the DMRS may be configured to be repeated at an interval of 4 REs.

FIG. 19 is a diagram illustrating an example (2) of a resource configuration for a HARQ response according to an embodiment of the present invention. This is an example where a single channel is placed in a frequency resource that is not used for PSFCH. The single channel may be either PSCCH or PSSCH. PSCCH or PSSCH may have a configuration similar to that shown in FIG. 18.

When the PSSCH is allocated and multiple types of data (e.g., control information and transport blocks) are multiplexed, as shown in FIG. 19, the encoding rate may be adjusted for each data type by configured or predefined parameters.

In accordance with the above-described embodiment, the terminal 20 can avoid overlap in frequency domain between the PSFCH used for the HARQ response and the channel or signal which is newly enabled to be transmitted. The terminal 20 may also improve the efficiency of resource utilization by using frequency resources not used for PSFCH. Further, the terminal 20 can improve the transmission quality by placing reference signals or control information on a frequency resource not used for the PSFCH, and even if the signal is not received, the transmission quality is less affected. The terminal 20 may also control the collision when the PSFCH transmissions overlaps with each other.

In other words, it is possible to improve the efficiency of the use of resources related to the HARQ (Hybrid automatic repeat request) response in direct communication between terminals.

(Equipment Configuration)

Next, function configuration examples of a base station 10 and a terminal 20 that execute the processes and the operations described above will be described. The base station 10 and the terminal 20 have functions for implementing the embodiments described above. However, each of the base station 10 and the terminal 20 may have only some of the functions in the embodiment.

<Base Station 10>

Figure 20:
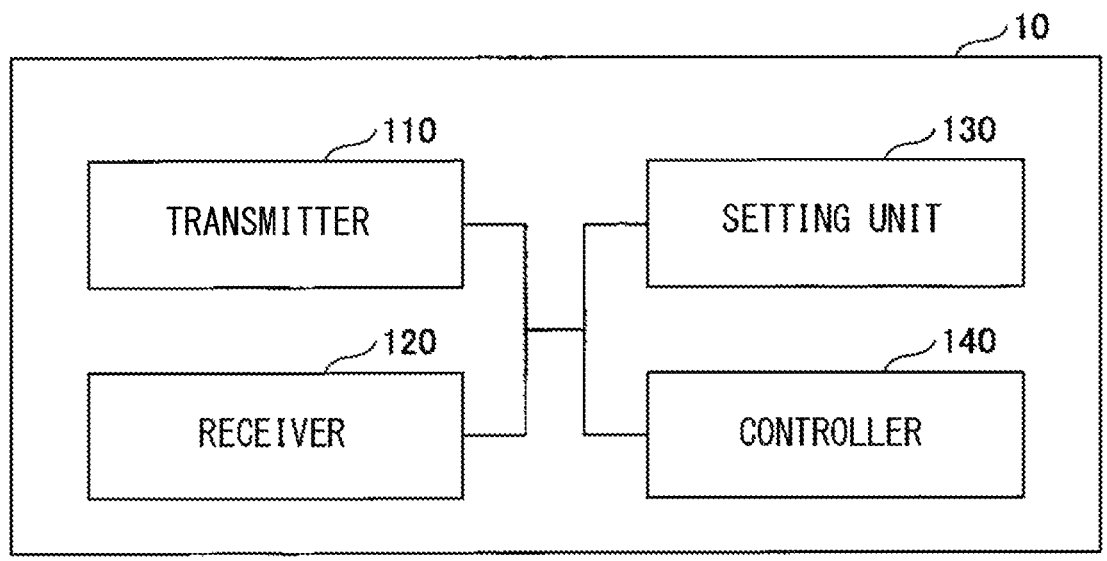
FIG. 20 is a diagram illustrating an example of a functional configuration of a base station 10 according to an embodiment of the present invention.

FIG. 20 is a diagram illustrating an example of a functional configuration of the base station 10. As illustrated in FIG. 20, the base station 10 includes a transmitter 110, a receiver 120, a setting unit 130, and a controller 140. The functional configuration illustrated in FIG. 20 is only an example. A functional classification and names of the functional unit may be any classification and any names as long as the operation according to an embodiment of the present invention can be executed.

The transmitter 110 includes a function of generating a signal to be transmitted to the terminal 20 side and transmitting the signal wirelessly. The receiver 120 includes a function of receiving various kinds of signals transmitted from the terminal 20 and acquiring, for example, higher layer information from the received signals. Further, the transmitter 110 includes a function of transmitting NR-PSS, NR-SSS, NR-PBCH, DL/UL control signals and DL reference signals or the like to the terminal 20.

The setting unit 130 stores setting information set in advance and various kinds of setting information to be transmitted to the terminal 20 in a storage device, and read from the storage device on demand. For example, content of the setting information is information related to configuration of D2D communication or the like.

As described in the embodiment, the controller 140 performs processing related to the setting in which a terminal 20 performs D2D communication. The controller 140 transmits scheduling of D2D communication and DL communication to a terminal 20 through the transmitter 110. The controller 140 receives information related to HARQ response of D2D communication and DL communication from a terminal 20 via the receiver 120. The functional unit related to signal transmission in the controller 140 may be included in the transmitter 110, and the functional unit related to signal reception in the controller 140 may be included in the receiver 120.

<Terminal 20>

Figure 21:
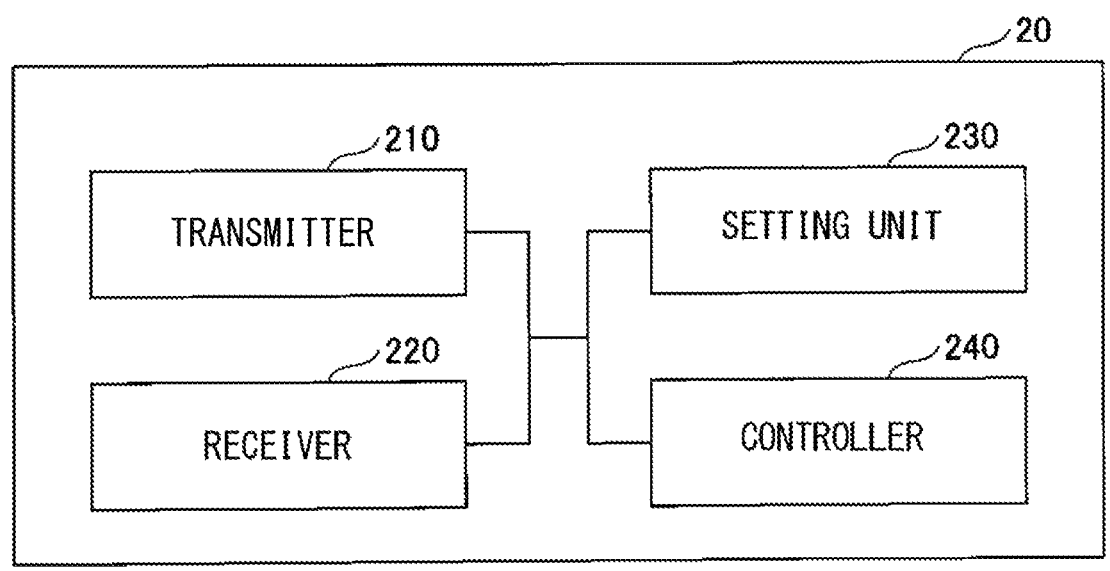
FIG. 21 a diagram illustrating an example of a functional configuration of a terminal 20 according to an embodiment of the present invention.

FIG. 21 is a diagram illustrating an example of a functional configuration of the terminal 20. As illustrated in FIG. 21, the terminal 20 includes a transmitter 210, a receiver 220, a setting unit 230, and a controller 240. The functional configuration illustrated in FIG. 21 is only an example. A functional classification and names of the functional unit may be any classification and any names as long as the operation according to an embodiment of the present invention can be executed.

The transmitter 210 generates a transmission signal from transmission data and transmits the transmission signal wirelessly. The receiver 220 wirelessly receives various kinds of signals and acquires higher layer signals from received physical layer signals. The receiver 220 includes a function of receiving NR-PSS, NR-SSS, NR-PBCH, and DL/UL/SL control signals and reference signals or the like transmitted from the base station 10. Further, for example, the transmitter 210 transmits a physical sidelink control channel (PSCCH), a physical sidelink shared channel (PSSCH), a physical sidelink discovery channel (PSDCH), a physical sidelink broadcast channel (PSBCH), and the like to another terminal 20 as D2D communication, and the receiver 220 receives PSCCH, PSSCH, PSDCH, PSBCH, and the like from another terminal 20.

The setting unit 230 stores various kinds of setting information received from the base station 10 or a terminal 20 by the receiver 220 in a storage device, and read from the storage device on demand. The setting unit 230 also stores the preset setting information. For example, content of the setting information is information related to configuration of D2D communication or the like.

The controller 240 controls D2D communication with other terminals 20 as described in the embodiment. The controller 240 performs processing related to HARQ of D2D communication and DL communication. The controller 240 transmits information related to HARQ response of D2D communication to another terminal 20 scheduled from a base station 10 and DL communication to the base station 10. The controller 240 may schedule D2D communication to another terminal 20. The controller 240 may autonomously select resources used for D2D communication from a resource selection window. The controller 240 performs processing pertaining to the MCS when transmitting and receiving D2D communication. A functional unit related to signal transmission in the controller 240 may be included in the transmitter 210, and a functional unit related to signal reception in the controller 240 may be included in the receiver 220.

(Hardware Configuration)

In the block diagrams (FIG. 20 and FIG. 21) used for the description of the embodiment, the blocks of the functional units are illustrated. The functional blocks (configuring units) are implemented by an arbitrary combination of hardware and/or software. In addition, the implementation method of each function block is not particularly limited. In other words, each functional block may be implemented by one device which is physically or logically combined or may be implemented by a plurality of devices, that is, two or more devices which are physically and/or logically separated and are directly or indirectly connected (for example, a wired and/or wireless manner). The function block may be implemented by combining software with the one device or the plurality of devices.

The functions include determining, deciding, judging, computing, calculating, processing, deriving, investigating, searching, confirming, receiving, transmitting, outputting, accessing, resolving, selecting, choosing, establishing, comparing, assuming, expectation, regarding, broadcasting, notifying, communicating, forwarding, configuring, reconfiguring, allocating, mapping, assigning, and the like but are not limited thereto. For example, a functional block (configuring unit) that causes transmission to function is referred to as a transmitting unit or a transmitter. In any case, as described above, an implementation method is not particularly limited.

Figure 22:
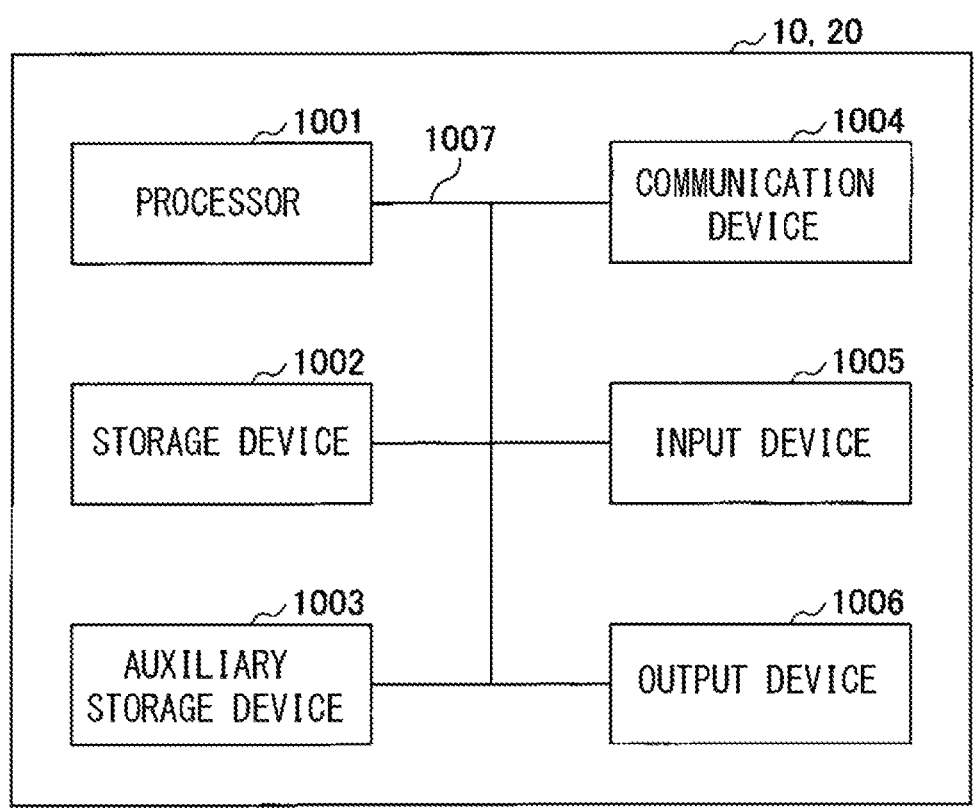
FIG. 22 is a diagram illustrating an example of a hardware configuration of the base station 10 or the terminal 20 according to an embodiment of the present invention.

For example, the base station 10, the terminal 20, or the like in one embodiment of the present disclosure may function as a computer for processing the present disclosure's wireless communication method. FIG. 22 is a diagram illustrating an example of a hardware configuration of the base station 10 and the terminal 20 according to an embodiment of the present disclosure. Each of the base station 10 and the terminal 20 may be physically configured as a computer device including a processor 1001, a storage device 1002, an auxiliary storage device 1003, a communication device 1004, an input device 1005, an output device 1006, a bus 1007, and the like.

In the following description, the term "device" can be read as a circuit, device, unit, or the like. The hardware configuration of each of the base station 10 and the terminal 20 may be configured to include one or more devices illustrated in the drawing or may be configured without including some devices.

Each function in the base station 10 and the terminal 20 is implemented such that predetermined software (program) is read on hardware such as the processor 1001 and the storage device 1002, and the processor 1001 performs an operation and controls communication by the communication device 1004 and reading and/or writing of data in the storage device 1002 and the auxiliary storage device 1003.

For example, the processor 1001 operates an operating system and controls the entire computer. The processor 1001 may be configured with a central processing unit (CPU) including an interface with a peripheral device, a control device, an operation device, a register, and the like. For example, the controller 140, the controller 240, and the like described above may be implemented by the processor 1001.

Further, the processor 1001 reads a program (program code), a software module, or data from at least one of the auxiliary storage device 1003 and/or the communication device 1004 out to the storage device 1002, and executes various types of processes according to them. A program causing a computer to execute at least some of the operations described in the above embodiment is used as the program. For example, the controller 140 of the base station 10 illustrated in FIG. 20 may be implemented by a control program which is stored in the storage device 1002 and operates on the processor 1001. Further, for example, the controller 240 of the terminal 20 illustrated in FIG. 21 may be implemented by a control program which is stored in the storage device 1002 and operates on the processor 1001. Various types of processes have been described as being performed by one processor 1001 but may be performed simultaneously or sequentially by two or more processors 1001. The processor 1001 may be implemented by one or more chips. The program may be transmitted from a network via an electric communication line.

The storage device 1002 is a computer readable recording medium and configured with at least one of a read only memory (ROM), an erasable programmable ROM (EPROM), an electrically erasable programmable ROM (EEPROM), a random access memory (RAM), and the like. The storage device 1002 is also referred to as a "register," a "cache," a "main memory," or the like. The storage device 1002 can store programs (program codes), software modules, or the like which are executable for carrying out the communication method according to an embodiment of the present disclosure.

The auxiliary storage device 1003 is a computer-readable recording medium and may be configured with, for example, at least one of an optical disk such as a compact disc ROM (CD-ROM), a hard disk drive, a flexible disk, a magneto-optical disk (for example, a compact disk, a digital versatile disk, or a Blu-ray (registered trademark) disc, a smart card, a flash memory (for example, a card, a stick, or a key drive), a floppy (registered trademark) disk, a magnetic strip, and the like. The storage medium may be, for example, a database, a server, or any other appropriate medium including at least one of the storage device 1002 and the auxiliary storage device 1003.

The communication device 1004 is hardware (a transceiving device) for performing communication between computers via at least one of a wired network and a wireless network, and is also referred to as a "network device," a "network controller," a "network card," a "communication module," or the like. The communication device 1004 may include a high-frequency switch, a duplexer, a filter, a frequency synthesizer, or the like in order to implement at least one of frequency division duplex (FDD) and time division duplex (TDD). For example, a transceiving antenna, an amplifying unit, a transmitting/receiving unit, a transmission line interface, or the like may be implemented by the communication device 1004. The transmitting/receiving unit may be implemented by to be physically or logically separated by a transmitting unit and a receiving unit.

The input device 1005 is an input device (for example, a keyboard, a mouse, a microphone, a switch, a button, a sensor, or the like) that receives an input from the outside. The output device 1006 is an output device (for example, a display, a speaker, an LED lamp, or the like) that performs output to the outside. The input device 1005 and the output device 1006 may be integrated (for example, a touch panel).

The respective devices such as the processor 1001 and the storage device 1002 are connected via the bus 1007 to communicate information with each other. The bus 1007 may be configured with a single bus or may be configured with different buses between the devices.

Further, each of the base station 10 and the terminal 20 may be configured to include hardware such as a microprocessor, a digital signal processor (DSP), an application specific integrated circuit (ASIC), a programmable logic device (PLD), or a field programmable gate array (FPGA) or all or some of the functional blocks may be implemented by hardware. For example, the processor 1001 may be implemented using at least one of these pieces of hardware.

Summary of Embodiments

As described above, according to an embodiment of the present invention, there is provided a terminal comprising: a controller configured to identify a resource that is included in a time domain in which a first channel used for transmitting a response related to retransmission control is allocated, and that is included in a frequency domain that is not used for transmitting the first channel; and a transmitter configured to transmit a second channel or a signal by using the resource.

With the above configuration, the terminal 20 can avoid overlap in frequency domain between the PSFCH used for the HARQ response and the channel or signal that is newly enabled to be transmitted. The terminal 20 may also improve the efficiency of resource utilization by using frequency resources not used for PSFCH. Further, the terminal 20 can improve the transmission quality by placing reference signals or control information on a frequency resource not used for the PSFCH, and even if the signal is not received, the transmission quality is less affected. The terminal 20 may also control the collision when the PSFCH transmissions overlaps with each other. In other words, it is possible to improve the efficiency of the use of resources related to the HARQ (Hybrid automatic repeat request) response in direct communication between terminals.

The controller may identify a resource in a frequency domain in which the first channel is not configured, a resource included in a frequency domain in which the first channel is not to be transmitted, among resources in which the first channel is configured, or a resource in a frequency domain in which the first channel is not to be transmitted. This configuration allows the terminal 20 to avoid overlap in frequency domain between the PSFCH used for the HARQ response and the channel or signal that is newly enabled to be transmitted. The terminal 20 may also improve the efficiency of resource utilization by using frequency resources not used in PSFCH.

The transmitter may transmit at least one of: a reference signal; a CSI (Channel state information); a SR (Scheduling request); and a signal for BFR (Beam failure recovery), by using the resource. This configuration allows the terminal 20 to improve transmission quality by placing reference signals or control information on frequency resources not used for the PSFCH.

The transmitter may transmit a signal for resource reservation by using the resource. This configuration allows the terminal 20 to improve transmission quality.

The second channel may be at least one of a control channel and a shared channel, the transmitter may transmit at least a part of a transport block through at least one of the control channel and the shared channel, and further comprising a receiver configured to receive a response related to retransmission control corresponding to the transport block via the first channel. This configuration allows the terminal 20 to improve transmission quality by transmitting the transport block via frequency resources not used for PSFCH.

Further, according to an embodiment of the present invention, there is provided a communication method executed by a terminal comprising a control step of identifying a resource that is included in a time domain in which a first channel used for transmitting a response related to retransmission control is allocated, and that is included in a frequency domain that is not used for transmitting the first channel; and a transmission step of transmitting a second channel or a signal by using the resource.

With the above configuration, the terminal 20 can avoid overlap in frequency domain between the PSFCH used for the HARQ response and the channel or signal that is newly enabled to be transmitted. The terminal 20 may also improve the efficiency of resource utilization by using frequency resources not used for PSFCH. Further, the terminal 20 can improve the transmission quality by placing reference signals or control information on a frequency resource not used for the PSFCH, and even if the signal is not received, the transmission quality is less affected. The terminal 20 may also control the collision when the PSFCH transmissions overlap with each other. In other words, it is possible to improve the efficiency of the use of resources related to the HARQ (Hybrid automatic repeat request) response in direct communication between terminals.

Supplement to Embodiments

The exemplary embodiment of the present invention has been described above, but the disclosed invention is not limited to the above embodiments, and those skilled in the art would understand various modified examples, revised examples, alternative examples, substitution examples, and the like. In order to facilitate understanding of the invention, specific numerical value examples have been used for description, but the numerical values are merely examples, and certain suitable values may be used unless otherwise stated. The classification of items in the above description is not essential to the present invention, matters described in two or more items may be combined and used if necessary, and a matter described in one item may be applied to a matter described in another item (unless inconsistent). The boundary between functional units or processing units in a functional block diagram does not necessarily correspond to the boundary between physical parts. Operations of a plurality of functional units may be performed physically by one component, or an operation of one functional unit may be physically performed by a plurality of parts. In the processing procedure described in the embodiments, the order of the processes may be changed as long as there is no inconsistency. For the sake of convenience of processing description, the base station 10 and the terminal 20 have been described using the functional block diagrams, but such devices may be implemented by hardware, software, or a combination thereof. Software executed by the processor included in the base station 10 according to the embodiment of the present invention and software executed by the processor included in the terminal 20 according to the embodiment of the present invention may be stored in a random access memory (RAM), a flash memory, a read only memory (ROM), an EPROM, an EEPROM, a register, a hard disk (HDD), a removable disk, a CD-ROM, a database, a server, or any other appropriate storage medium.

Further, a notification of information is not limited to the aspect or embodiment described in the present disclosure and may be given by any other method. For example, the notification of information may be given by physical layer signaling (for example, downlink control information (DCI) or uplink control information (UCI)), upper layer signaling (for example, radio resource control (RRC) signaling, medium access control (MAC) signaling, broadcast information (master information block (MIB), system information block (SIB))), other signals, or a combination thereof. Further, the RRC signaling may be referred to as an RRC message and may be, for example, an RRC connection setup message, an RRC connection reconfiguration message, or the like.

Each aspect and embodiment of the present invention may be applied to at least one of Long Term Evolution (LTE), LTE-advanced (LTE-A), SUPER 3G, IMT-advanced, 4th generation mobile communication system (4G), 5th generation mobile communication system (5G), Future Radio Access (FRA), New Radio (NR), W-CDMA (registered trademark), GSM (registered trademark), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), a system using any other appropriate system, a next generation systems extended on the basis of these standards, or the like. Further, a plurality of systems may be combined and applied (for example, a combination of at least one of LTE and LTE-A and 5G or the like).

The processing procedures, the sequences, the flowcharts, and the like of the respective aspects/embodiments described in this specification may be reversed in order unless there is a contradiction. For example, the method described in the present disclosure presents elements of various steps using an exemplary order and is not limited to a presented specific order.

In this specification, a specific operation that is supposed to be performed by the base station 10 may be performed by an upper node in some cases. In the network including one or more network nodes including the base station 10, various operations performed for communication with the terminal 20 can be obviously performed by at least one of the base station and any network node (for example, an MME, an S-GW, or the like is considered, but it is not limited thereto) other than the base station 10 and/or the base station 10. The example in which the number of network nodes excluding the base station 10 is one has been described above, but other network nodes in which a plurality of other network nodes (for example, an MME and an S-GW) are combined may be provided.

Information, a signal, or the like described in the present disclosure may be output from an upper layer (or a lower layer) to a lower layer (or an upper layer). Information, a signal, or the like described in the present disclosure may be input and output via a plurality of network nodes.

Input and output information and the like may be stored in a specific place (for example, a memory) or may be managed through a management table. Input and output information and the like may be overwritten, updated, or additionally written. Output information and the like may be deleted. Input information and the like may be transmitted to another device.

The determination the present disclosure may be performed in accordance with a value (0 or 1) indicated by one bit, may be performed in accordance with a Boolean value (true or false), or may be performed by a comparison of numerical values (for example, a comparison with a predetermined value).

Software can be interpreted widely to mean a command, a command set, a code, a code segment, a program code, a program, a subprogram, a software module, an application, a software application, a software package, a routine, a subroutine, an object, an executable file, an execution thread, a procedure, a function, and the like regardless of whether software is called software, firmware, middleware, a microcode, a hardware description language, or any other name.

Further, software, commands, information, and the like may be transmitted and received via a transmission medium. For example, when software is transmitted from a web site, a server, or any other remote source using at least one of a wired technology (such as a coaxial cable, a fiber optic cable, a twisted pair, or a digital subscriber line (DSL)) and a radio technology (such as infrared rays or a microwave), at least one of the wired technology and the radio technology are included in a definition of a transmission medium.

Information, signals, and the like described in this specification may be indicated using any one of a variety of different techniques. For example, data, instructions, commands, information, signals, bits, symbols, chips, and the like which are mentioned throughout the above description may be indicated by voltages, currents, electromagnetic waves, magnetic particles, optical fields or photons, or an arbitrary combination thereof.

The terms described in the present disclosure and terms necessary for understanding the present disclosure may be replaced with terms having the same or similar meanings. For example, at least one of a channel and a symbol may be a signal. Further, a signal may be a message. Further, a component carrier (CC) may be referred to as a "carrier frequency," a "cell," or the like.

The terms "system" and "network" used in the present disclosure are used interchangeably.

Further, information, parameters, and the like described in the present disclosure may be indicated by absolute values, may be indicated by relative values from predetermined values, or may be indicated by corresponding other information. For example, radio resources may be those indicated by an index.

The names used for the above-described parameters are not limited in any respect. Further, mathematical formulas or the like using the parameters may be different from those explicitly disclosed in the present disclosure. Since various channels (for example, a PUCCH, a PDCCH, and the like) and information elements can be identified by suitable names, various names allocated to the various channels and the information elements are not limited in any respect.

In the present disclosure, the terms "base station (BS)," "radio base station," "base station," "fixed station," "Node B," "eNode B (eNB)," "gNodeB (gNB)," "access point," "transmission point," "reception point," "transmission/reception point," "cell," "sector," "cell group," "carrier,"

"component carrier," and the like can be used interchangeably. The base stations may also be indicated by terms such as a macrocell, a small cell, a femtocell, and a picocell.

The base station eNB can accommodate one or more (for example, three) cells. In a case in which the base station accommodates a plurality of cells, the entire coverage area of the base station can be partitioned into a plurality of small areas, and each small area can provide a communication service through a base station subsystem (for example, a small indoor base station (a remote radio head (RRH)). The term "cell" or "sector" refers to the whole or a part of the coverage area of at least one of the base station and the base station subsystem that performs a communication service in the coverage.

In the present disclosure, the terms "mobile station (MS)," "user terminal," "user equipment (UE)," "terminal," and the like can be used interchangeably.

The mobile station may be a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, it may also be referred to as a remote terminal, handset, user agent, mobile client, client, or some other suitable term.

At least one of the base station and the mobile station may be also referred to as a transmitting device, a receiving device, a communication device, or the like. At least one of the base station and the mobile station may be a device installed in a mobile body, a mobile body itself, or the like. The moving body may be a vehicle (for example, a car, an airplane, or the like), a moving body that moves unmanned (for example, a drone, an autonomous car or the like), or a robot (manned type or unmanned type). At least one of the base station and the mobile station includes a device which need not necessarily move during a communication operation. For example, at least one of the base station and the mobile station may be an Internet of things (IoT) device such as a sensor.

Further, the base station in the present disclosure may be replaced with a user terminal. For example, each aspect/embodiment of the present disclosure may be applied to a configuration in which communication between the base station and the user terminal is replaced with communication between a plurality of user terminal 20 (for example, which may be referred to as device-to-device (D2D) or vehicle-to-everything (V2X)). In this case, the terminal 20 may have the functions of the base station 10 described above. Further, the terms "uplink" and "downlink" may be replaced with terms (for example, "side") corresponding to inter-terminal communication. For example, an uplink channel, a downlink channel, or the like may be read with side channels.

Similarly, the user terminal in the present disclosure may be replaced with the base station. In this case, the base station may have the functions of the above-mentioned user terminal.

The terms "determining" and "deciding" used in this specification may include a wide variety of actions. For example, "determining" and "deciding" may include, for example, events in which events such as judging, calculating, computing, processing, deriving, investigating, looking up, search, and inquiry (for example, looking up in a table, a database, or another data structure), or ascertaining are regarded as "determining" or "deciding." Further, "determining" and "deciding" may include, for example, events in which events such as receiving (for example, receiving information), transmitting (for example, transmitting information), input, output, or accessing (for example, accessing data in a memory) are regarded as "determining" or "deciding." Further, "determining" and "deciding" may include, for example, events in which events such as resolving, selecting, choosing, establishing, or comparing are regarded as "determining" or "deciding." In other words, "determining" and "deciding" may include events in which a certain operation is regarded as "determining" or "deciding." Further, "determining (deciding)" may be replaced with "assuming," "expecting," "considering," or the like.

Terms "connected," "coupled," or variations thereof means any direct or indirect connection or coupling between two or more elements and may include the presence of one or more intermediate elements between two elements which are "connected" or "coupled." The coupling or the connection between the elements may be physical, logical, or a combination thereof. For example, "connection" may be replaced with "access." In a case in which used in the present disclosure, two elements may be considered to be "connected" or "coupled" with each other using at least one of one or more electric wires, cables and/or a printed electrical connection or using electromagnetic energy having a wavelength in a radio frequency domain, a microwave region, or a light (both visible and invisible) region as non-limiting and non-exhaustive examples.

A reference signal may be abbreviated as RS and may be referred to as a pilot, depending on a standard to be applied.

A phrase "on the basis of" used in the present disclosure is not limited to "on the basis of only" unless otherwise stated. In other words, a phrase "on the basis of" means both "on the basis of only" and "on the basis of at least."

Any reference to an element using a designation such as "first," "second," or the like used in the present disclosure does not generally restrict quantities or an order of those elements. Such designations can be used in the present disclosure as a convenient method of distinguishing two or more elements. Thus, reference to the first and second elements does not mean that only two elements can be adopted there, or the first element must precede the second element in a certain form.

Further, "means" in the configuration of each of the above devices may be replaced with "unit," "circuit," "device," or the like.

In a case in which "include," "including," and variations thereof are used in the present disclosure, these terms are intended to be comprehensive, similarly to a term "comprising." Further, the term "or" used in the present disclosure is intended not to be an exclusive-OR.

A radio frame may include one or more frames in time domain. In time domain, each of one or more frames may be referred to as a sub frame. The sub frame may further include one or more slots in time domain. The sub frame may have a fixed time length (for example, 1 ms) not depending on numerology.

The numerology may be a communication parameter applied to at least one of transmission and reception of a certain signal or channel. For example, the numerology may indicate at least one of a sub carrier spacing (SCS), a bandwidth, a symbol length, a cyclic prefix length, a transmission time interval (TTI), a number of symbols per TTI, a radio frame configuration, a specific filtering process performed in frequency domain by a transceiver, a specific windowing process performed in time domain by a transceiver, and the like.

The slot may include one or more symbols (orthogonal frequency division multiplexing (OFDM) symbols, single carrier frequency division multiple access (SC-FDMA)

symbols, or the like) in time domain. The slot may be a time unit based on the numerology.

The slot may include a plurality of mini slots. Each mini slot may include one or more symbols in time domain. Further, the mini slot may be referred to as a sub-slot. The mini slot may include fewer symbols than a slot. A PDSCH (or PUSCH) transmitted in units of times greater than the mini slot may be referred to as a PDSCH (or PUSCH) mapping type A. A PDSCH (or PUSCH) transmitted using a mini slot may be referred to as a PDSCH (or PUSCH) mapping type B.

All of a radio frame, a sub frame, a slot, a mini slot, and a symbol indicates a time unit for transmitting a signal. As a radio frame, a sub frame, a slot, a mini slot, and a symbol, different designations respectively corresponding to them may be used.

For example, one sub frame may be referred to as a transmission time interval (TTI: Transmission Time Interval), or a plurality of consecutive sub frames may be referred to as TTIs, or one slot or one mini slot may be referred to as a TTI. In other words, at least one of the sub frame and the TTI may be a sub frame (1 ms) in the existing LTE, may be a period shorter than 1 ms (for example, 1 to 13 symbols), or may be referred to as a period longer than 1 ms. A unit representing the TTI may be referred to as slot, a mini slot, or the like instead of the sub frame.

Here, for example, the TTI refers to a minimum time unit of scheduling in wireless communication. For example, in the LTE system, the base station performs scheduling of allocating a radio resource (a frequency bandwidth, a transmission power, or the like which can be used in each user terminal 20) to each user terminal 20 in units of TTIs. The definition of the TTI is not limited thereto.

The TTI may be a transmission time unit such as a channel coded data packet (transport block), a code block, or a code word, or may be a processing unit such as scheduling or link adaptation. Further, when a TTI is given, a time interval (for example, the number of symbols) in which a transport block, a code block, a code word, or the like is actually mapped may be shorter than the TTI.

Further, when one slot or one mini slot is referred to as a TTI, one or more TTIs (that is, one or more slots or one or more mini slots) may be a minimum time unit of scheduling. Further, the number of slots (the number of mini slots) constituting the minimum time unit of scheduling may be controlled.

A TTI having a time length of 1 ms may be referred to as a common TTI (TTI in LTE Rel. 8 to 12), a normal TTI, a long TTI, a common sub frame, a normal sub frame, a long sub frame, a slot, or the like. A TTI shorter than the common TTI may be referred to as a reduced TTI, a short TTI, a partial TTI (a partial or fractional TTI), a reduced sub frame, a short sub frame, a mini slot, a sub slot, a slot, or the like.

Further, a long TTI (for example, a common TTI, a sub frame, or the like) may be replaced with a TTI having a time length exceeding 1 ms, and a short TTI (for example, a reduced TTI or the like) may be replaced with a TTI having a TTI length which is less than a TTI length of a long TTI and equal to or more than 1 ms.

The resource block (RB) is a resource allocation unit in time domain and frequency domain and may include one or more consecutive subcarriers in frequency domain. The number of sub carriers included in an RB may be the same irrespective of a numerology and may be, for example, 12. The number of sub carriers included in an RB may be decided on the basis of a numerology.

Further, a time domain of an RB may include one or more symbols and may be a length of one slot, one mini slot, one sub frame, or one TTI. Each of one TTI, one sub frame, or the like may be constituted by one or more resource blocks.

Further, one or more RBs may be referred to as a physical resource block (PRB), a sub carrier group (SCG), a resource element group (REG), a PRB pair, an RB pair, or the like.

Further, the resource block may be constituted by one or more resource elements (RE). For example, one RE may be a radio resource region of one subcarrier and one symbol.

A bandwidth part (BWP) (which may be referred to as a partial bandwidth) may indicate a subset of consecutive common resource blocks (RBs) for a certain numerology in a certain carrier. Here, a common RB may be specified by an index of an RB based on a common reference point of a carrier. A PRB may be defined in a BWP and numbered in a BWP.

The BWP may include a BWP for UL (UL BWP) and a BWP for DL (DL BWP). In a terminal 20, one or more BWPs may be configured within one carrier.

At least one of configured BWPs may be active, and it need not be assumed that the terminal 20 transmits and receives a predetermined signal/channel outside an active BWP. Further, a "cell," a "carrier," or the like in the present disclosure may be replaced with a "BWP."

Structures of the radio frame, the sub frame, slot, the mini slot, and the symbol are merely examples. For example, configurations such as the number of sub frames included in a radio frame, the number of slots per sub frame or radio frame, the number of mini slots included in a slot, the number of symbols and RBs included in a slot or a mini slot, the number of sub carriers included in an RB, the number of symbols in a TTI, a symbol length, a cyclic prefix (CP) length, and the like can be variously changed.

In the entire present disclosure, for example, when an article such as "a," "an," or "the" in English is added by a translation, the present disclosure may include a case in which a noun following the article is the plural.

In the present disclosure, a term "A and B are different" may mean "A and B are different from each other." Further, the term may mean "each of A and B is different from C." Terms such as "separated," "coupled," or the like may also be interpreted in similarly to "different."

Each aspect/embodiment described in this specification may be used alone, in combination, or may be switched in accordance with the execution. Further, notification of predetermined information (for example, notification of "being X") is not limited to being performed explicitly, but may be performed by implicit (for example, by giving no notification of predetermined information).

The HARQ response in this disclosure is an example of a response related to retransmission control. PSFCH is an example of a channel used for sending and receiving retransmission control responses. PSCCH is an example of a control channel. PSSCH is an example of a shared channel.

Although the present disclosure has been described above in detail, it is obvious to those skilled in the art that the present disclosure is not limited to the embodiments described in the present disclosure. The present disclosure may be implemented as revised and modified forms without departing from the gist and scope of the present disclosure as configured forth in claims. Therefore, the description of the present disclosure is for the purpose of illustration and does not have any restrictive meaning to the present disclosure.

REFERENCE SIGNS LIST

10 NETWORK NODE
110 TRANSMITTER

120 RECEIVER
130 SETTING UNIT
140 CONTROLLER
20 USER DEVICE
210 TRANSMITTER
220 RECEIVER
230 SETTING UNIT
240 CONTROLLER
1001 PROCESSOR
1002 STORAGE DEVICE
1003 AUXILIARY STORAGE DEVICE
1004 COMMUNICATION DEVICE
1005 INPUT DEVICE
1006 OUTPUT DEVICE

The invention claimed is:

1. A terminal comprising:
 a controller configured to identify
  a first frequency resource used for transmission of a hybrid automatic repeat request (HARQ) response in a device to device communication, and
  a second frequency resource used for transmission of second information that is used, in a time resource configured for a channel used for transmission of the HARQ response, for a purpose different from a purpose of the HARQ response; and
 a transmitter configured to transmit the second information to another terminal via the channel used for the transmission of the HARQ response in the time resource, based on the second frequency resource that is different from the first frequency resource,
 wherein the controller prioritizes transmission of the HARQ response over transmission of the second information in a case where the transmission of the HARQ response overlaps the transmission of the second information.

2. The terminal according to claim 1, wherein the first frequency resource and the second frequency resource are indicated by a physical resource block.

3. A communication method executed by a terminal, the communication method comprising:
 identifying
  a first frequency resource used for transmission of a hybrid automatic repeat request (HARQ) response in a device to device communication, and
  a second frequency resource used for transmission of second information that is used, in a time resource configured for a channel used for the transmission of the HARQ response, for a purpose different from a purpose of the HARQ response; and
 transmitting the second information to another terminal via the channel used for the transmission of the HARQ response in the time resource, based on the second frequency resource that is different from the first frequency resource,
 wherein the terminal prioritizes transmission of the HARQ response over transmission of the second information in a case where the transmission of the HARQ response overlaps the transmission of the second information.

* * * * *